(12) United States Patent
Sato

(10) Patent No.: US 8,516,896 B2
(45) Date of Patent: Aug. 27, 2013

(54) SEMICONDUCTOR PRESSURE SENSOR AND METHOD OF MANUFACTURING THE SAME

(75) Inventor: Kimitoshi Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 223 days.

(21) Appl. No.: 13/205,923

(22) Filed: Aug. 9, 2011

(65) Prior Publication Data

US 2012/0152029 A1  Jun. 21, 2012

(30) Foreign Application Priority Data

Dec. 17, 2010  (JP) .................................. 2010-281549

(51) Int. Cl.
*G01L 9/00* (2006.01)
*B23P 23/00* (2006.01)
*H01L 21/00* (2006.01)

(52) U.S. Cl.
USPC .................................. 73/754; 438/53; 29/592

(58) Field of Classification Search
USPC .................................................... 73/700–756
See application file for complete search history.

(56) References Cited

U.S. PATENT DOCUMENTS

| 5,189,777 | A | | 3/1993 | Guckel et al. |
| 5,357,807 | A | | 10/1994 | Guckel et al. |
| 5,589,810 | A | * | 12/1996 | Fung ................................. 338/4 |
| 5,672,551 | A | * | 9/1997 | Fung ................................. 438/53 |
| 7,563,724 | B2 | | 7/2009 | Sato |
| 7,926,354 | B2 | | 4/2011 | Sato |
| 2011/0140215 | A1 | | 6/2011 | Sato |

FOREIGN PATENT DOCUMENTS

| JP | 3-6824 | 1/1991 |
| JP | 4-294234 | 10/1992 |

OTHER PUBLICATIONS

U.S. Appl. No. 13/205,923, filed Aug. 9, 2011, Sato.

* cited by examiner

*Primary Examiner* — Andre Allen
(74) *Attorney, Agent, or Firm* — Oblon, Spivak, McClelland, Maier & Neustadt, L.L.P.

(57) ABSTRACT

In a method of manufacturing a semiconductor pressure sensor, a multilayer structure including a polysilicon diaphragm, a polysilicon gauge resistor formed on a side of a space which is to serve as a vacuum chamber below the polysilicon diaphragm, and a group of insulating films containing the polysilicon diaphragm and the polysilicon gauge resistor and having an etching solution introduction hole in contact with a sacrificial layer is formed on the sacrificial layer. Then, an etching solution is supplied through the etching solution introduction hole and the sacrificial layer is etched with the etching solution, to thereby obtain a diaphragm body formed of the multilayer structure, which functions on the vacuum chamber, and a surface of a silicon substrate below a first opening of a first insulating film is etched to thereby form the space which is to serve as the vacuum chamber and a diaphragm stopper disposed in the space, protruding toward near the center of the diaphragm body. With this structure, it is possible to provide a technique for suppressing the variation in the performance of a semiconductor pressure sensor when the semiconductor pressure sensor is downsized.

20 Claims, 36 Drawing Sheets

F I G . 1
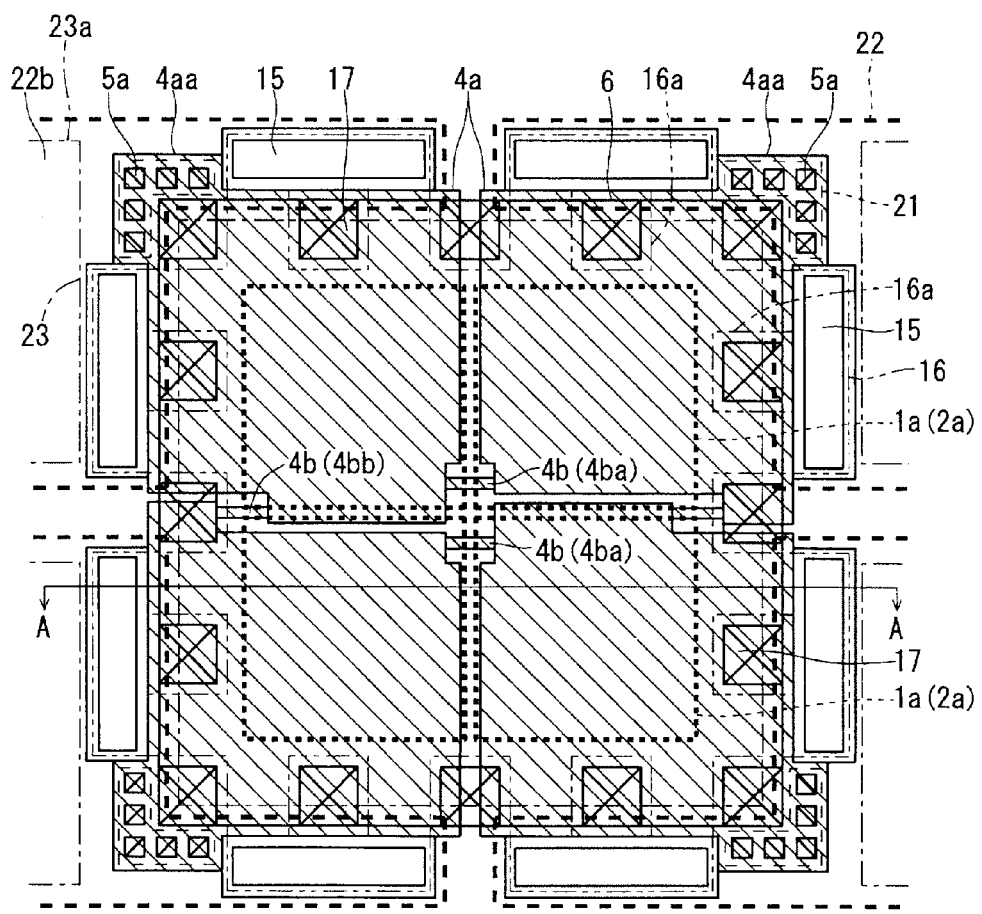

F I G . 5
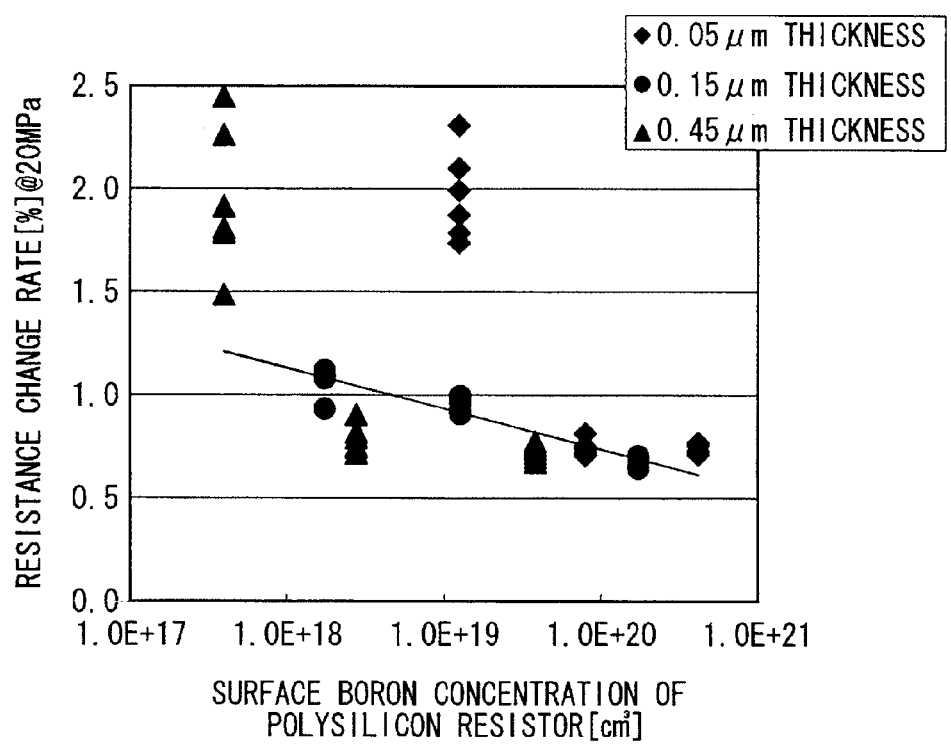

F I G. 6
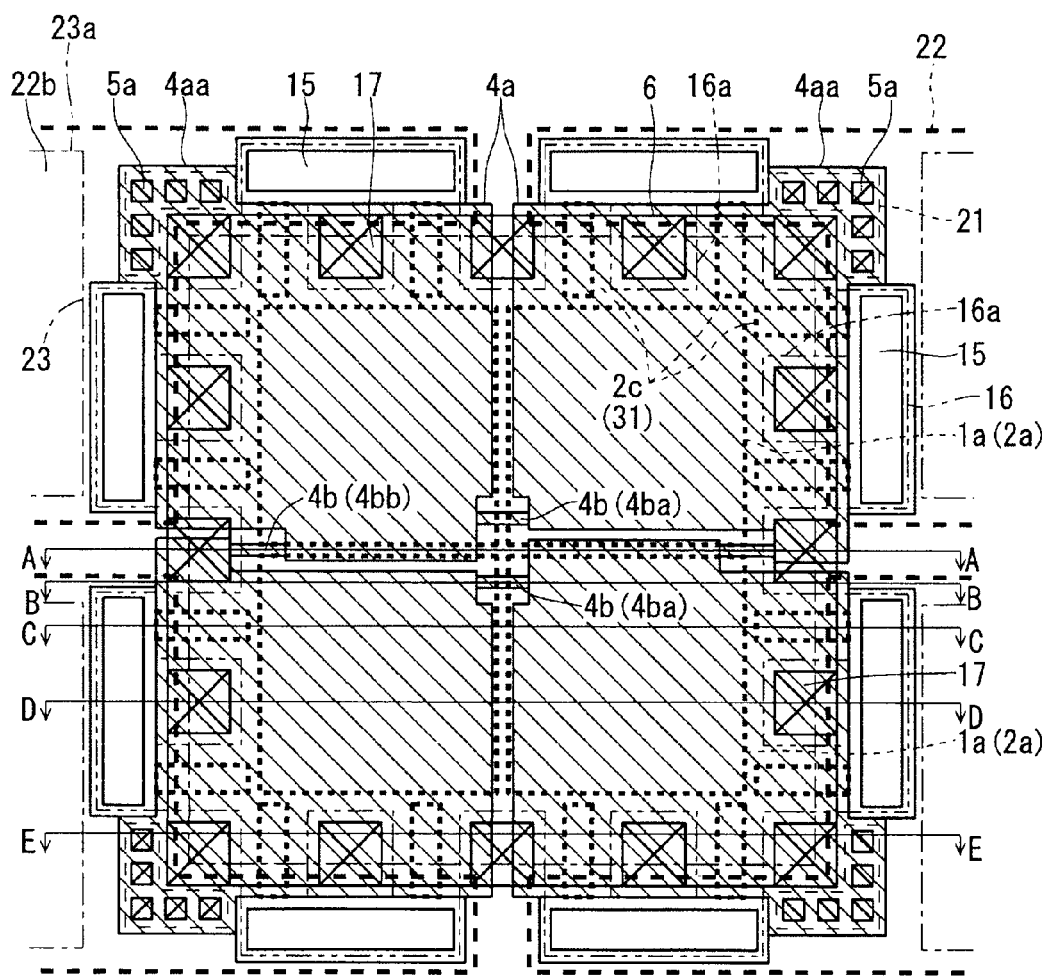

FIG. 7 CROSS SECTION ALONG LINE A-A

CROSS SECTION ALONG LINE D-D

CROSS SECTION ALONG LINE E-E

CROSS SECTION ALONG LINE A-A

CROSS SECTION ALONG LINE E-E

F I G . 2 2
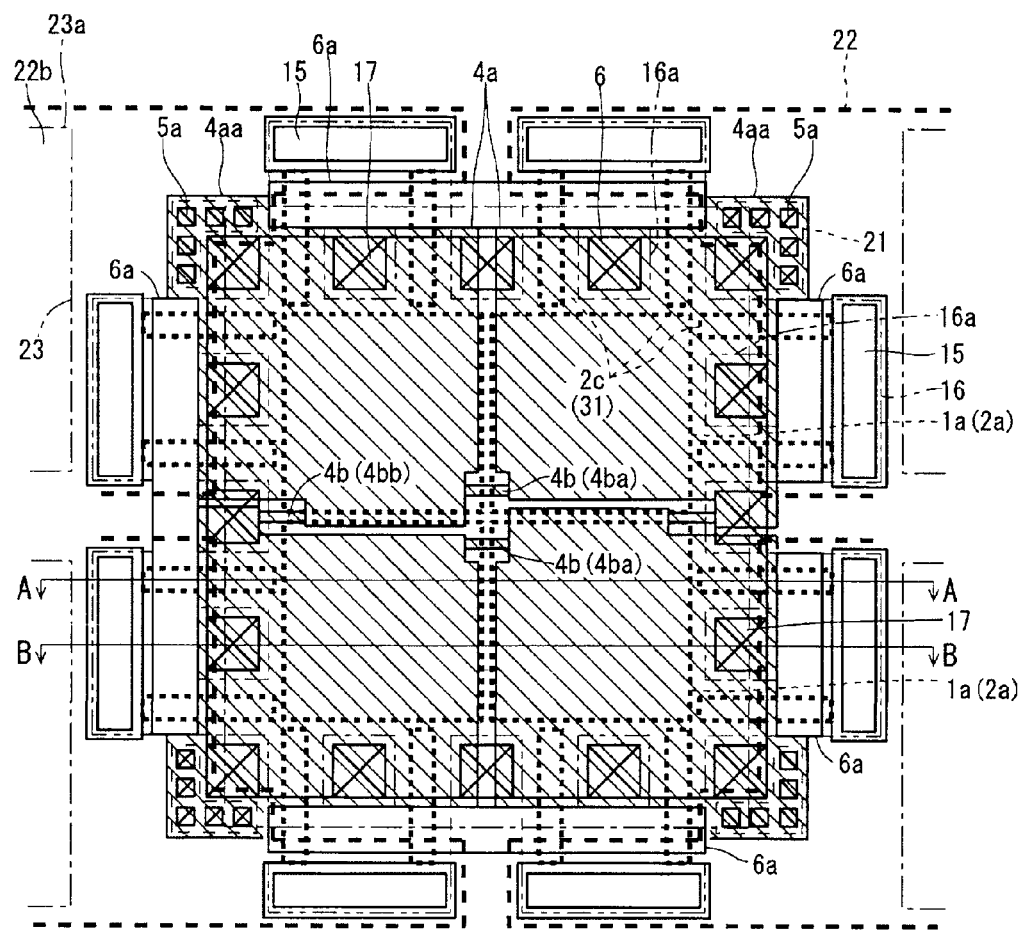

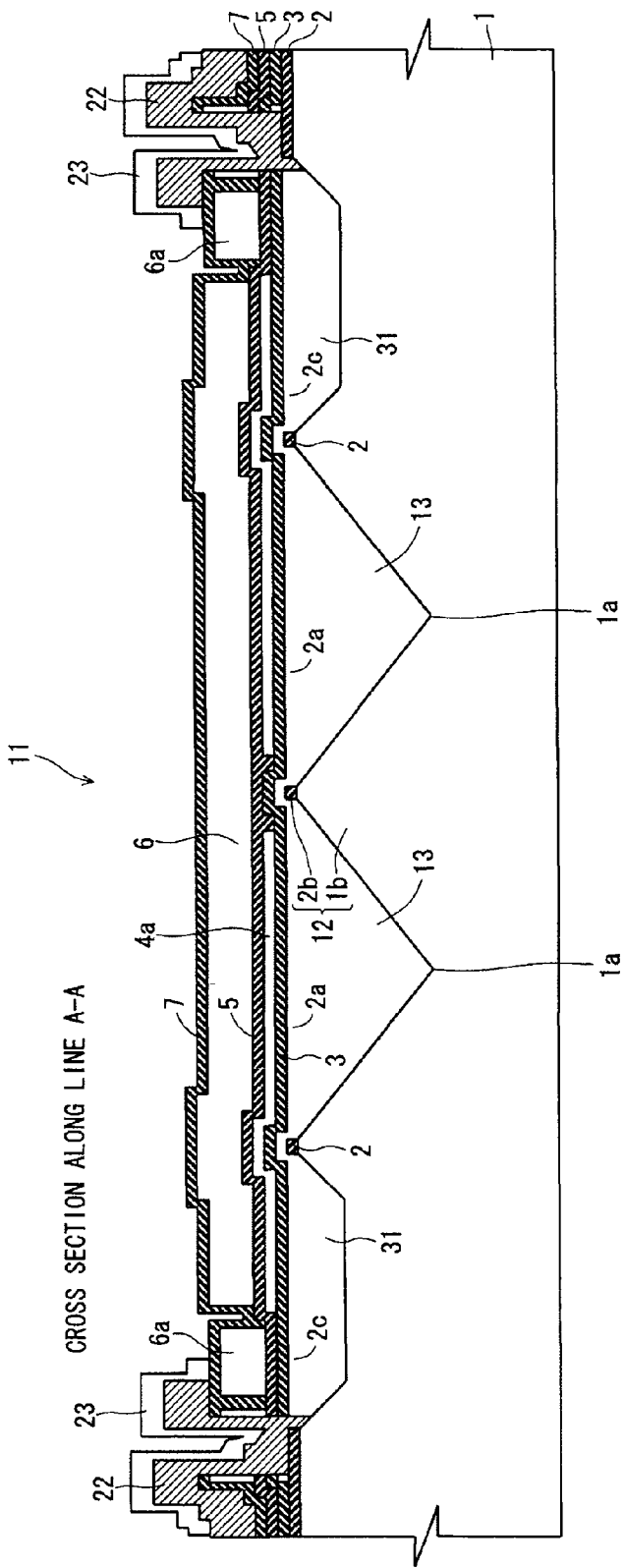

CROSS SECTION ALONG LINE A-A

CROSS SECTION ALONG LINE B-B

CROSS SECTION ALONG LINE C-C

SEMICONDUCTOR PRESSURE SENSOR AND METHOD OF MANUFACTURING THE SAME

BACKGROUND OF THE INVENTION

1. Field of the Invention

The present invention relates to a semiconductor pressure sensor and a method of manufacturing the same, and more particularly to a semiconductor pressure sensor including polysilicon gauge resistors and a method of manufacturing the same.

2. Description of the Background Art

As a type of pressure sensor, a semiconductor pressure sensor using a semiconductor substrate is used. In such a semiconductor pressure sensor, a plurality of diffused resistors serving as gauge resistors of which the resistance varies in accordance with pressure applied thereto are formed on a surface of a silicon substrate and the diffused resistors are bridged by diffusion wires of which the resistance value is low. The gauge resistors are arranged, for example, at respective portions of four sides of a rectangular diaphragm (thin film). On the other hand, on a surface of the silicon substrate which is opposite to the region in which the gauge resistors are arranged, a recess is formed to form a diaphragm therein. Japanese Patent Application Laid Open Gazette No. 3-6824 (Patent Document 1) discloses this type of semiconductor pressure sensor.

In the background-art semiconductor pressure sensor, the above-discussed recess, i.e., the diaphragm is formed by grinding a silicon substrate to a predetermined thickness and then etching a back surface of the silicon substrate with a predetermined etching mask.

In such a manufacturing method, the thickness of the silicon substrate under the recess is controlled by the length of etching time, and this causes a problem that the thickness of the diaphragm is apt to vary. Further, even in an attempt to reduce the thickness of the diaphragm, the thickness can be reduced up to about 10 μm at least in consideration of the variation in the amount of silicon in the substrate surface to be grinded and etched. Furthermore, since the variation in the amount of silicon of the substrate to be etched may cause misalignment between the gauge resistors and the recess, it is difficult to downsize the semiconductor pressure sensor with high accuracy.

SUMMARY OF THE INVENTION

It is an object of the present invention to provide a technique for suppressing the variation in the performance of a semiconductor pressure sensor, which is caused by downsizing.

The present invention is intended for a method of manufacturing a semiconductor pressure sensor. According to an aspect of the present invention, the method includes the following steps (a) to (d). The step (a) is to form a first insulating film having a plurality of first openings on a semiconductor substrate. The step (b) is to form a sacrificial layer on the first insulating film, being in contact with the semiconductor substrate in the plurality of first openings of the first insulating film. The step (c) is to form a multilayer structure on the sacrificial layer, the multilayer structure including a polysilicon diaphragm, a polysilicon gauge resistor formed on a side of a space which is to serve as a vacuum chamber below the polysilicon diaphragm, and a group of insulating films containing the polysilicon diaphragm and the polysilicon gauge resistor and having an etching solution introduction hole in contact with the sacrificial layer. The step (d) is to etch the sacrificial layer with an etching solution supplied through the etching solution introduction hole to thereby obtain a diaphragm body formed of the multilayer structure, which functions on the vacuum chamber, and to etch a surface of the semiconductor substrate below the plurality of first openings of the first insulating film to thereby form the space which is to serve as the vacuum chamber and a diaphragm stopper disposed in the space, protruding toward near the center of the diaphragm body.

The diaphragm body is formed of the multilayer structure which allows the control over the film thickness, the configuration, and the alignment with high accuracy. Therefore, it is possible to suppress the variation in the performance of the semiconductor pressure sensor, which is caused by downsizing. Since the diaphragm stopper protrudes, supporting the portion near the center of the diaphragm body which is apt to be distorted, this makes it possible to prevent the diaphragm body from being broken and allows thinning and downsizing of the diaphragm body. Further, since the polysilicon gauge resistor is disposed on the side of the vacuum chamber below the polysilicon diaphragm, the polysilicon gauge resistor resists being affected by the external environment. Therefore, a highly reliable semiconductor pressure sensor can be provided. Furthermore, by etching, the space in the diaphragm body is formed adjacently to the sacrificial layer. Therefore, since the flow of the etching solution or the like increases, it is possible to reduce the time required for the process steps of etching and the like and thereby reduce the time required for manufacturing the semiconductor pressure sensor.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plan view showing a semiconductor pressure sensor in accordance with a first preferred embodiment;

FIG. 5 is a graph for explanation on the thickness of a polysilicon film of the semiconductor pressure sensor in accordance with the first preferred embodiment;

FIG. 6 is a plan view showing a semiconductor pressure sensor in accordance with a second preferred embodiment;

FIG. 22 is a plan view showing a semiconductor pressure sensor in accordance with a fifth preferred embodiment;

FIG. 23 is a cross section showing the semiconductor pressure sensor in accordance with the fifth preferred embodiment, taken along a line A-A of FIG. 22;

DESCRIPTION OF THE PREFERRED EMBODIMENTS

The First Preferred Embodiment

Figure 2:
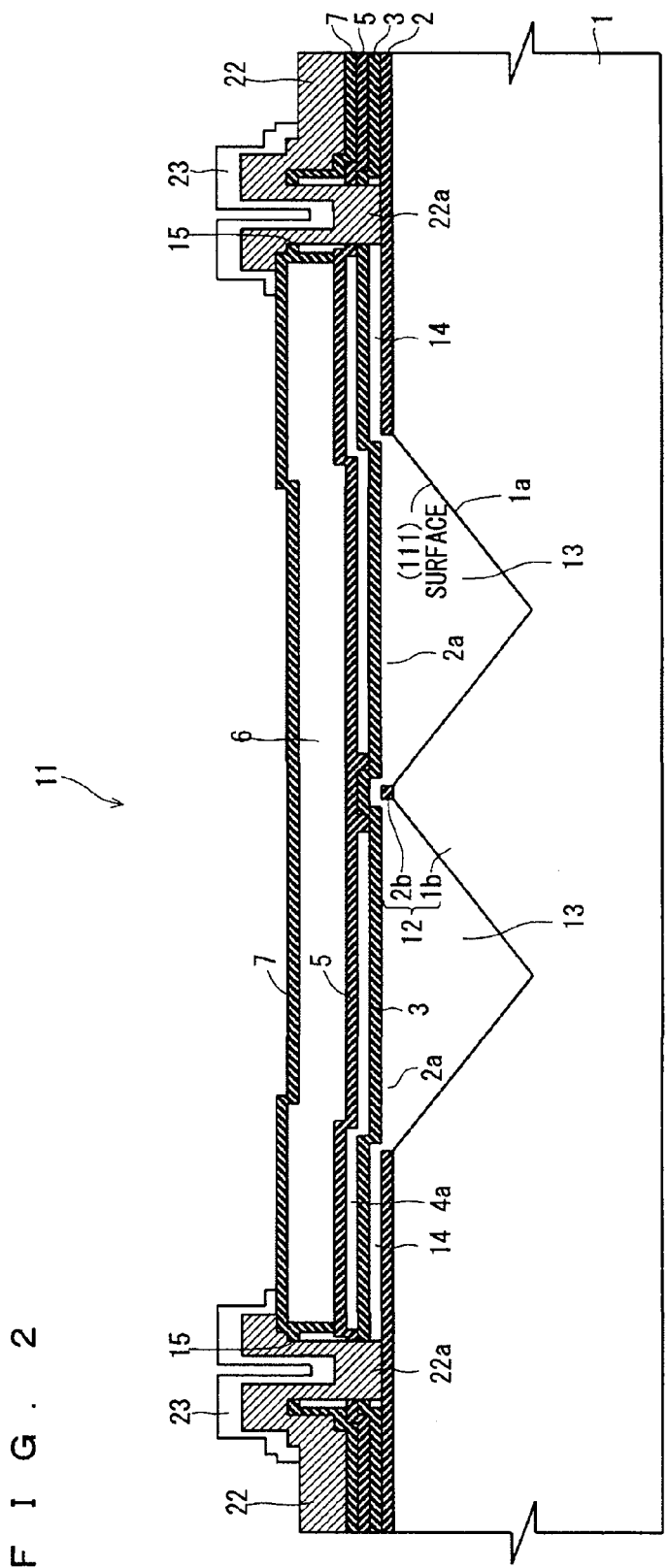
FIG. 2 is a cross section showing the semiconductor pressure sensor in accordance with the first preferred embodiment, taken along a line A-A of FIG. 1.

FIG. 1 is a plan view showing a semiconductor pressure sensor in accordance with the first preferred embodiment of the present invention, and FIG. 2 is a cross section taken along a line A-A of FIG. 1.

The semiconductor pressure sensor of the first preferred embodiment comprises a silicon substrate 1 which is a semiconductor substrate on which a plurality of (herein, four) recesses 1a are formed, a first insulating film 2 having a plurality of first openings 2a formed on the silicon substrate 1, a diaphragm body 11 formed of a multilayer structure, a first metal layer 21 (indicated by a thin broken line in FIG. 1), a second metal layer 22 (indicated by a thick broken line in FIG. 1), and a glass coat 23 (indicated by a thin one-dot chain line in FIG. 1).

The diaphragm body 11 includes a polysilicon wire 4a, a polysilicon gauge resistor 4b, a polysilicon diaphragm 6 formed above these elements 4a and 4b, and a group of insulating films consisting of a second insulating film 3, a third insulating film 5, and a fourth insulating film 7, which contains the above elements 4a, 4b, and 6. The diaphragm body 11 is formed above the silicon substrate 1 with a space 13 over the recess 1a interposed therebetween, and a peripheral portion of the diaphragm body 11 is supported by the first insulating film 2. When the diaphragm body 11 receives a pressure such as the atmospheric pressure in a direction from the side of a front surface of the silicon substrate 1 toward a back surface thereof (the direction toward the space 13), the diaphragm body 11 can be distorted, bending downward in accordance with the pressure and can output an electrical signal indicating the degree of the distortion, i.e., the magnitude of the pressure.

The space 13 is a vacuum chamber and sealed by a sealing portion 22a which is positioned outside the plurality of recesses 1a. In the following discussion, the space 13 is sometimes referred to as a "vacuum chamber 13". In the first preferred embodiment, the plurality of recesses 1a of the silicon substrate 1, the plurality of first openings 2a of the first insulating film 2, and a surface of the diaphragm body 11 on the side of the recesses 1a form the vacuum chamber 13 (space 13). An etching solution introduction hole 15 communicating with the vacuum chamber 13 is provided in the group of insulating films at a position outside the diaphragm body 11 in a plan view (FIG. 1) and sealed by the sealing portion 22a.

Next, detailed description will be made on constituent elements of the semiconductor pressure sensor of the first preferred embodiment.

In the plan view (FIG. 1), each of the four recesses 1a has a rectangular shape in the surface of the silicon substrate 1, and two recesses 1a are arranged in a length direction and two are also arranged in a width direction, being away from one another. The recess 1a has a convex shape tapering downward in a cross section (FIG. 2). The vertical position of the surface of the silicon substrate 1 between the two recesses 1a is as high as that of the surface of the silicon substrate 1 with the first insulating film 2, and the silicon substrate 1 has a tapering convex portion 1b facing the diaphragm body 11. At a tip portion of the convex portion 1b, provided is a tip insulating film 2b which is formed by patterning the insulating film at the same time as the first insulating film 2 is formed.

On the silicon substrate 1 in the vacuum chamber 13, provided is a diaphragm stopper 12 protruding toward near the center of the diaphragm body 11. In the first preferred embodiment, the diaphragm stopper 12 consists of the convex portion 1b and the tip insulating film 2b and has a function of preventing the diaphragm body 11 from being broken by high pressure given from outside and preventing the first insulating film 2 of the diaphragm body 11 from being fixed onto the silicon substrate 1 in the manufacturing process.

In the first preferred embodiment, a tip portion of the diaphragm stopper 12 (herein, the tip insulating film 2b) has a cross shape which is present in a clearance among the four recesses 1a in the plan view (FIG. 1). The width of the tip portion of the diaphragm stopper 12 (herein, the tip insulating film 2b) is 5 μm or less.

The first insulating film 2 is formed on the silicon substrate 1 and has the plurality of first openings 2a corresponding to the plurality of recesses 1a, respectively. Specifically, in the plan view (FIG. 1), the plurality of first openings 2a each have a rectangular shape and two first openings 2a are arranged in a length direction and two are also arranged in a width direction, being away from one another, like the recesses 1a. In order to obtain the first insulating film 2, for example, an oxide film such as HTO, TEOS, or the like is formed by CVD (Chemical Vapor Deposition) or the like and then patterned.

The second insulating film 3 is formed largely on the first insulating film 2 in a region outside the sealing portions 22a which are opposed to each other and formed largely over the first insulating film 2 with an air gap 14 interposed therebetween in a region inside the sealing portions 22a as shown in FIG. 2. In an anchor 17 shown in the plan view (FIG. 1), however, the second insulating film 3 and the first insulating film 2 are formed to be in contact with each other even inside the sealing portions 22a. In other words, the second insulating film 3 is supported by the first insulating film 2 in the peripheral portion (the anchor 17) of the diaphragm body 11. In order to obtain the second insulating film 3, for example, an oxide film such as HTO, TEOS, or the like is formed by CVD and then patterned.

In the cross section (FIG. 2), the polysilicon wire 4a and the polysilicon gauge resistor 4b are formed on the second insulating film 3. In the plan view (FIG. 1), the polysilicon wire 4a is divided into four portions by shape which is almost like the cross shape of the tip portion of the diaphragm stopper 12 and the polysilicon wires 4a adjacent to one another in the length and width directions are connected to one another through the polysilicon gauge resistors 4b. The whole shape of the four polysilicon wires 4a is a substantially rectangular shape having overhanging portions 4aa slightly overhanging outside at the four corners.

In the plan view (FIG. 1), the four polysilicon gauge resistors 4b are formed, each extending laterally, and having the same size. In the first preferred embodiment, the two polysilicon gauge resistors 4ba connecting the polysilicon wires 4a which are laterally adjacent to each other are formed near the center of the diaphragm body 11 and the two polysilicon gauge resistors 4bb connecting the polysilicon wires 4a which are longitudinally adjacent to each other are formed near two edges of the diaphragm body 11, which are opposed to each other. The four polysilicon gauge resistors 4b are so bridged with the polysilicon wires 4a as to form a Wheatstone bridge circuit described later. These polysilicon gauge resistors 4b are obtained by implantation of impurity such as boron (B), phosphorus (P), or the like into polysilicon and then annealing, so that optimal piezoresistance effect and resistance value can be achieved. In the first preferred embodiment, the polysilicon gauge resistors 4b are p-type gauge resistors obtained by implantation of boron (B).

In the cross section (FIG. 2), the third insulating film 5 is formed on the polysilicon wires 4a and the polysilicon gauge resistors 4b and on side surfaces thereof. The third insulating film 5 has a plurality of polysilicon wire contact portions 5a which are openings formed on the overhanging portion 4aa of the polysilicon wire 4a shown in FIG. 1, from which the polysilicon wire 4a is exposed. On the polysilicon wire 4a in the polysilicon wire contact portions 5a, formed is the first metal layer 21 (indicated by a thin broken line). In order to obtain the third insulating film 5, for example, an oxide film such as HTO, TEOS, or the like is formed by CVD and then patterned.

In the cross section (FIG. 2), the polysilicon diaphragm 6 is formed on the third insulating film 5. The polysilicon diaphragm 6 is formed of, for example, doped polysilicon.

In the cross section (FIG. 2), the fourth insulating film 7 is formed on the polysilicon diaphragm 6 and on a side surface thereof. In order to obtain the fourth insulating film 7, for example, an oxide film such as HTO, TEOS, or the like is formed by CVD and then patterned.

In the group of insulating films consisting of the second insulating film 3, the third insulating film 5, and the fourth insulating film 7, as shown in FIG. 2, provided is the etching solution introduction hole 15 communicating with the space 13 with the air gap 14 interposed therebetween. The etching solution introduction hole 15 is filled with part of the second metal layer 22 as the sealing portion 22a.

The second metal layer 22 is formed over the polysilicon wire contact portions 5a, the etching solution introduction hole 15 longitudinally adjacent to the polysilicon wire contact portions 5a in the plan view (FIG. 1), and the etching solution introduction hole 15 laterally adjacent to the polysilicon wire contact portions 5a in the plan view (FIG. 1). The second metal layer 22 comes into contact with the first metal layer 21 formed in the polysilicon wire contact portions 5a, to thereby bridge the polysilicon gauge resistors 4b. Further, the second metal layer 22 fills the etching solution introduction hole 15 as discussed above, to thereby vacuum seal the space 13. As the material of the second metal layer 22, for example, aluminum (Al) is used.

On the second metal layer 22, formed is the glass coat 23 for protecting the second metal layer 22. The glass coat 23 has an opening having the same shape as the polysilicon diaphragm 6 and has an opening 23a from which the second metal layer 22 is exposed, on the side opposite to the polysilicon diaphragm 6 with respect to the polysilicon wire contact portions 5a and the etching solution introduction hole 15. The second metal layer 22 in the opening 23a is used as an electrode pad 22b.

Next, discussion will be made on an operation of the semiconductor pressure sensor having the above structure in accordance with the first preferred embodiment. In the semiconductor pressure sensor, when a pressure is applied to the diaphragm body 11, the diaphragm body 11 is distorted in accordance with the pressure and the resistance value of the polysilicon gauge resistor 4b included in the diaphragm body 11 changes in accordance with the distortion.

Figure 3:
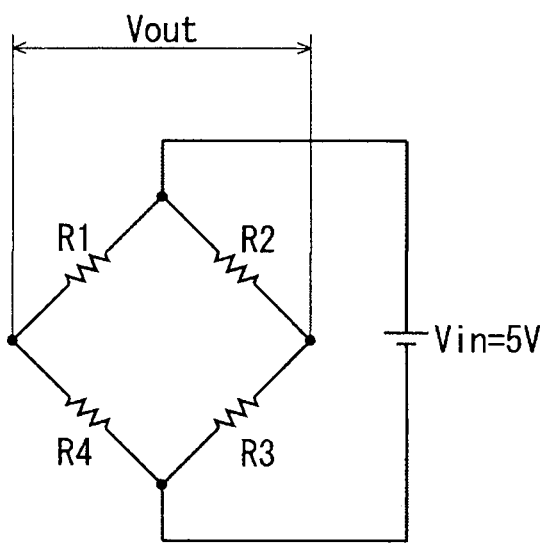
FIG. 3 is a view showing a circuit configuration of the semiconductor pressure sensor in accordance with the first preferred embodiment.

FIG. 3 is a view showing bridge connection of the above-described four polysilicon gauge resistors 4b with the polysilicon wires 4a. It is assumed herein that the two polysilicon gauge resistors 4ba near the center of the diaphragm body 11 have a resistance R1 and a resistance R3, respectively, and the two polysilicon gauge resistors 4bb on the edge sides of the diaphragm body 11 have a resistance R2 and a resistance R4, respectively.

In FIG. 3, the polysilicon gauge resistors 4ba and 4bb having the resistances R1 to R4 constitute a Wheatstone bridge circuit, and an input voltage Vin (=5 V) is applied between a contact between the polysilicon gauge resistors 4ba and 4bb having the resistance R1 and the resistance R2, respectively, and a contact between the polysilicon gauge resistors 4ba and 4bb having the resistance R3 and the resistance R4, respectively.

In this case, assuming that an output voltage between a contact between the polysilicon gauge resistors 4ba and 4bb having the resistance R1 and the resistance R4, respectively, and a contact between the polysilicon gauge resistors 4bb and 4ba having the resistance R2 and the resistance R3, respectively, is Vout, Vout=(R2/(R2+R3)−R1/(R1+R4))×Vin. In an initial state where no pressure is applied to the diaphragm body 11 (for example, R1=R2=R3=R4=100Ω), Vout=0 V.

The resistance value of the polysilicon gauge resistor 4b hardly changes when a stress is applied thereto perpendicularly with respect to the direction in which current flows and the resistance value changes when a stress is applied in the direction in which current flows.

Herein, when a pressure is applied to the diaphragm body 11, the center portion of the diaphragm body 11 is so distorted as to become convex downward. In this case, the p-type polysilicon gauge resistor 4ba provided below the center of the polysilicon diaphragm 6 receives a tensile stress in the same direction as the direction of current flow and the resistance value thereof is changed to a positive value ("+"). On the other hand, the p-type polysilicon gauge resistor 4bb provided below the edge of the polysilicon diaphragm 6 receives a compressive stress in the same direction as the direction of current flow and the resistance value thereof is changed to a negative value ("−").

In an exemplary case where the resistance change rate of the resistances R1 and R3 is obtained as ΔR1/R1=ΔR3/R3=+1% and the resistance change rate of the resistances R2 and R4 is obtained as ΔR2/R2=ΔR4/R4=−1% when a pressure of 1 atm (0.098 MPa) is applied to the diaphragm body 11, the output voltage Vout=(99/(99+101)−101/(101+99))×1=50 mV. Since the magnitude of the output voltage Vout changes in accordance with the magnitude of the pressure applied to the diaphragm body 11, the diaphragm body 11 can generate an output voltage indicating the pressure applied to the diaphragm body 11.

Generally, the performance of the semiconductor pressure sensor depends on the area and the thickness of the diaphragm body 11. Therefore, for downsizing of the semiconductor pressure sensor, it is important that the area and the thickness do not vary.

In the first preferred embodiment, the area of the diaphragm body 11 substantially depends on the area of the polysilicon diaphragm 6 supported by the anchor 17 and the thickness of the diaphragm body 11 substantially depends on the CVD film thickness of the polysilicon diaphragm 6. The polysilicon diaphragm 6 is formed of the multilayer structure which allows the control over the variation in the area and thickness and the positional difference among the layers in the multilayer structure. Therefore, in the first preferred embodiment, even when the semiconductor pressure sensor is downsized, it is possible to suppress variation in the performance of the semiconductor pressure sensor.

Further, in the semiconductor pressure sensor of the first preferred embodiment, with the diaphragm stopper 12, it is possible to prevent the diaphragm body 11 from being broken even when excessive pressure is applied thereto in a process. Therefore, it becomes possible to easily reduce the film thickness of the polysilicon diaphragm 6.

Figure 4:
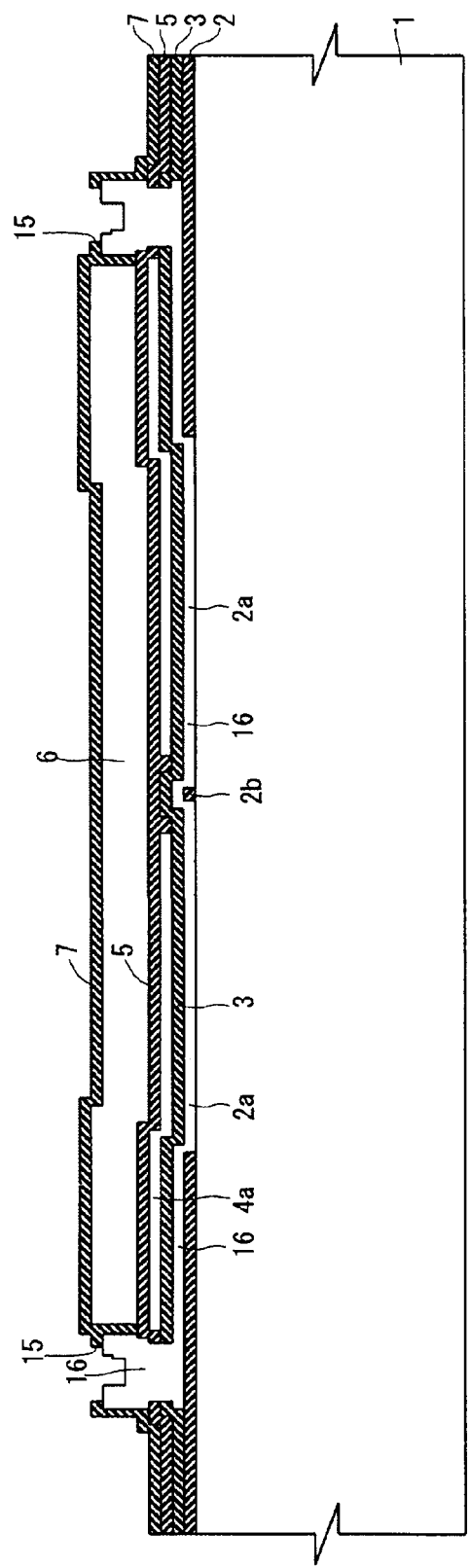
FIG. 4 is a cross section showing a process of manufacturing the semiconductor pressure sensor in accordance with the first preferred embodiment.
Figure 7:
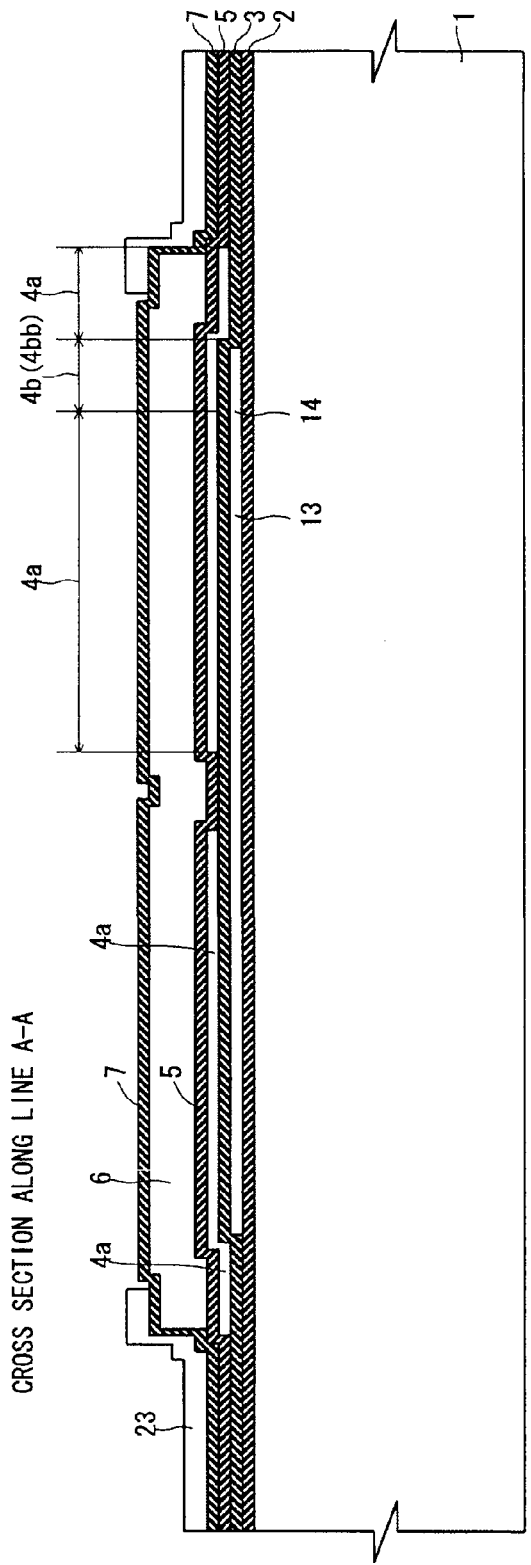
FIG. 7 is a cross section showing the semiconductor pressure sensor in accordance with the second preferred embodiment, taken along a line A-A of FIG. 6.
Figure 8:
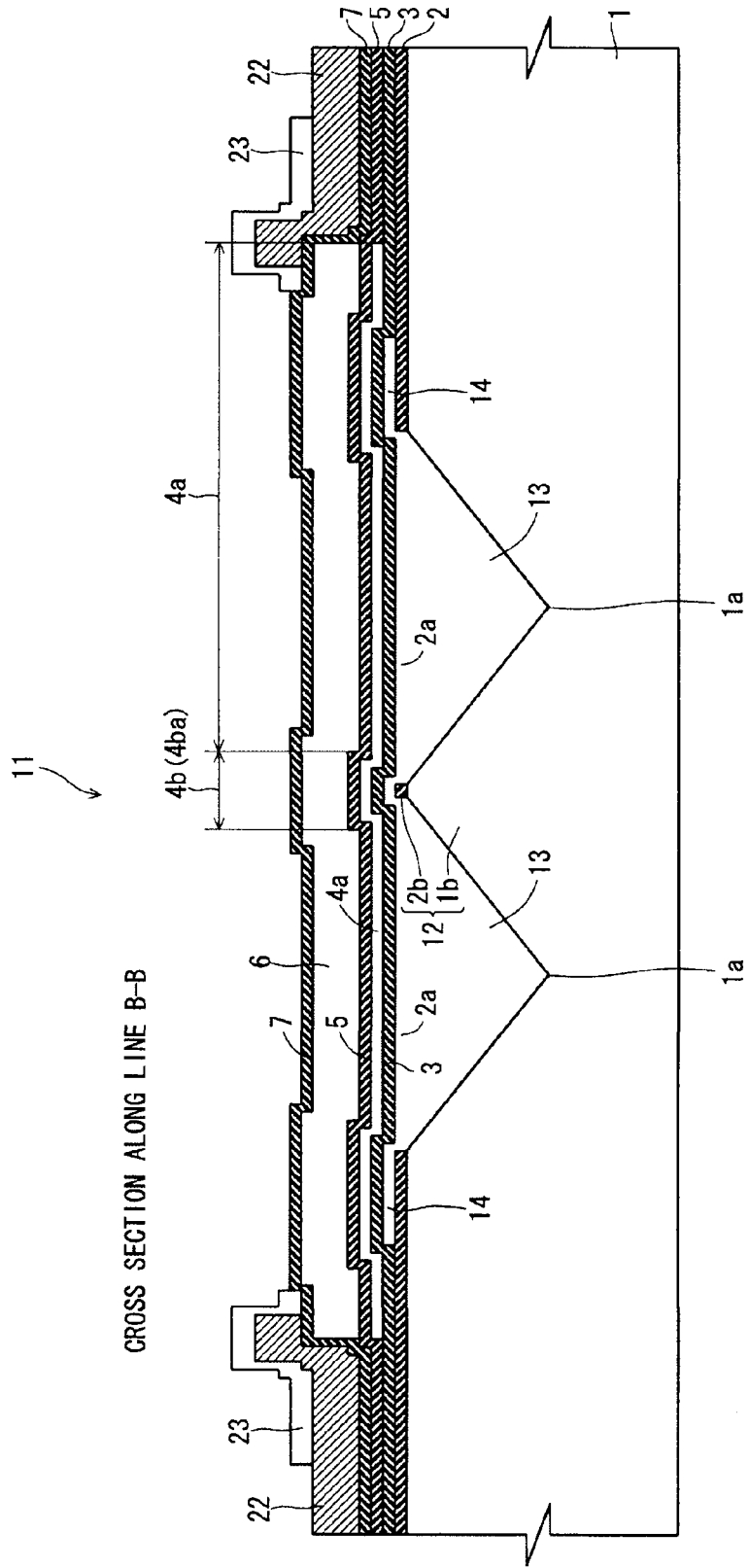
FIG. 8 is a cross section showing the semiconductor pressure sensor in accordance with the second preferred embodiment, taken along a line B-B of FIG. 6.

FIG. 4 is a cross section corresponding to FIG. 2, showing part of a process of manufacturing the semiconductor pressure sensor in accordance with the first preferred embodiment. Next, with reference to FIG. 4, discussion will be made on a method of manufacturing the semiconductor pressure sensor in accordance with the first preferred embodiment.

First, the silicon substrate 1 having a main surface of which crystal orientation is (100) is prepared in order to perform crystal anisotropic etching with an etching solution in a later process step.

Then, the first insulating film 2 having the plurality of first openings 2a is formed on the main surface of the silicon substrate 1. In the first preferred embodiment, in order to obtain the first insulating film 2, a thermal oxide film is so formed on the main surface of the silicon substrate 1 as to have a film thickness of about 0.1 to 1.0 μm, or an oxide film such as TEOS, HTO, or the like is so deposited by CVD as to have a film thickness of about 0.1 to 1.0 μm, and then the film is so patterned as to have the plurality of first openings 2a. At that time, the interval between adjacent first openings 2a is 5 μm or less.

Next, on the first insulating film 2, formed is the sacrificial layer 16 (indicated by a two-dot chain line in FIG. 1) which is in contact with the silicon substrate 1 in the plurality of first openings 2a of the first insulating film 2. In the first preferred embodiment, in order to obtain the sacrificial layer 16, a doped polysilicon film is so deposited on the first insulating film 2 by CVD as to have a film thickness of about 0.1 to 0.4 μm and then the film is patterned. As discussed later in more detail, the sacrificial layer 16 is removed by using a crystal orientation-dependent anisotropic etching solution such as TMAH or the like, and at that time, a portion of the silicon substrate 1 below the first openings 2a is also removed by the above etching solution, to thereby form the space 13 and the air gap 14 described above. In the first preferred embodiment, the sacrificial layer 16 has a substantially rectangular shape indicated by the two-dot chain line in the plan view (FIG. 1) and has a plurality of openings 16a (indicated by a two-dot chain line forming a rectangular shape) formed slightly inside the circumference thereof, in each of which the anchor 17 is formed.

After that, on the sacrificial layer 16, formed is the multilayer structure including the polysilicon diaphragm 6, the polysilicon wire 4a and the polysilicon gauge resistor 4b formed on a side of the space 13 which is to serve as the vacuum chamber below the polysilicon diaphragm 6, and the group of insulating films containing these elements 6, 4a, and 4b. Hereinafter, discussion will be made on formation of the multilayer structure.

In the first preferred embodiment, an oxide film such as TEOS, HTO, or the like is so deposited by CVD on the sacrificial layer 16 and the first insulating film 2 on which no sacrificial layer 16 is formed as to have a film thickness of about 0.1 to 0.3 μm and then the film is patterned, to thereby form the second insulating film 3. In each of the openings 16a of the sacrificial layer 16, the first insulating film 2 and the second insulating film 3 come into contact with each other, to form the anchor 17.

Then, a polysilicon film which is to become the polysilicon wire 4a and the polysilicon gauge resistor 4b is so deposited on the second insulating film 3 as to have a film thickness of about 0.1 to 0.3 μm and then the film is patterned. The pattern for forming the polysilicon wires 4a is formed symmetrically on the almost entire surface of the polysilicon diaphragm 6, in consideration of the effect of a stress onto the polysilicon diaphragm 6, in order to make the wire resistance value as low as possible. It is preferable that the thickness of the polysilicon film formed thus should be about 0.15 μm, and this will be discussed in detail later.

Next, an oxide film such as TEOS, HTO, or the like is so deposited on the polysilicon film and on the side surfaces thereof by CVD as to have a film thickness of about 0.1 μm, to thereby form the third insulating film 5. After that, p-type impurity such as boron (B) or the like is implanted into the polysilicon film, to thereby form the polysilicon wires 4a and the polysilicon gauge resistors 4b above the second insulating film 3 and below the third insulating film 5. Then, annealing is performed.

FIG. 5 is a graph showing the resistance change rate with respect to the boron concentration in the surface of the polysilicon gauge resistor 4b. FIG. 5 shows respective results of the experiments where the thickness of the polysilicon film which is to become the polysilicon gauge resistor 4b is 0.05 μm, 0.15 μm, and 0.45 μm. As shown in this figure, in the case where the thickness is 0.15 μm, there is a relation of log approximation between the resistance change rate and the surface boron concentration, and the variation is small. Therefore, it is preferable that the thickness of the polysilicon gauge resistors 4b (the above-discussed polysilicon film) having the resistances R1 to R4 should be about 0.15 μm, more specifically, should range from 0.1 to 0.3 μm. By setting the thickness thus, it is possible to provide the polysilicon gauge resistors 4b which allows high piezoresistance effect and small variation.

After that, the third insulating film 5 is patterned to form the plurality of polysilicon wire contact portions (openings) 5a on the overhanging portion 4aa of the polysilicon wire 4a. Then, in each of the polysilicon wire contact portions 5a, formed is the first metal layer 21 for connecting the polysilicon wire 4a with the second metal layer 22. The first metal layer 21 also serves to prevent the polysilicon wire 4a from being etched during the etching of the sacrificial layer 16 with the etching solution in the later process step.

Next, a doped polysilicon film which is to become the polysilicon diaphragm 6 is so deposited by CVD on the third insulating film 5 as to have a film thickness of about 0.3 to 2.0 μm and then the film is patterned, to thereby form the polysilicon diaphragm 6. After that, a high-temperature heat treatment is performed at 1000° C. or higher in order to activate the impurity of boron (B) or the like implanted into the polysilicon wires 4a and the polysilicon gauge resistors 4b and control the stress onto the polysilicon diaphragm 6.

Then, an oxide film such as TEOS, HTO, or the like which is to become the fourth insulating film 7 is so deposited by CVD on the polysilicon diaphragm 6 and on the side surfaces thereof as to have a film thickness of about 0.1 to 0.3 μm and the film is patterned. Thus, on the sacrificial layer 16, formed is the multilayer structure including the polysilicon wire 4a, the polysilicon gauge resistor 4b, the polysilicon diaphragm 6 and the group of insulating films (consisting of the second insulating film 3, the third insulating film 5, the fourth insulating film 7) containing these elements 6, 4a, and 4b.

After that, the group of insulating films is patterned, to thereby form the etching solution introduction hole 15 being in contact with the sacrificial layer 16. Though the second to fourth insulating films 3, 5, and 7 are layered and then the etching solution introduction hole 15 is formed in the group of insulating films in this case, this is only one exemplary process and there may be another process where an opening is formed in the patterning for each of the insulating films, to thereby form the etching solution introduction hole 15.

Then, a special etching solution such as TMAH or the like which does not corrode a metal such as aluminum (Al) or the like is supplied through the etching solution introduction hole 15 and isotropic etching of the sacrificial layer 16 is performed to thereby obtain the diaphragm body 11 formed of the above-discussed multilayer structure, which functions on the vacuum chamber 13. In the first preferred embodiment, after a while from the start of the etching of the sacrificial layer 16, the etching solution carried in the etching solution introduction hole 15 reaches the first openings 2a of the first insulating film 2 to come into contact with the silicon substrate 1. As a result, the surface of the silicon substrate 1 under the first openings 2a of the first insulating film 2 is anisotropically etched with the etching solution, to thereby form the space 13 which is to serve as the vacuum chamber and the diaphragm stopper 12 which is disposed in the space 13 and protrudes toward near the center of the diaphragm body 11.

In the first preferred embodiment, the crystal orientation of the surface of the silicon substrate 1 on which the first insulating film 2 is formed is (100). Therefore, since the anisotropic etching of the silicon substrate 1 stops at the point of time when the (111) surface overlaps it, it is possible to prevent the etching from unnecessarily proceeding even when the etching time is prolonged by some reason.

Further, since the material of the first to fourth insulating films 2, 3, 5, and 7 covering the polysilicon wires 4a, the polysilicon gauge resistors 4b, the polysilicon diaphragm 6, and the like is HTO or TEOS which is hardly etched with TMAH in the first preferred embodiment, the films have sufficient resistance even though the film thickness is about 0.1 μm. Therefore, it is possible to protect the polysilicon wires 4a and the like against the etching solution. In the anchor 17 shown in FIG. 1, the first insulating film 2 and the second insulating film 3 are kept in contact with each other even after the etching and the diaphragm size depends on the arrangement of the anchors 17. The diaphragm size and the overlay accuracy of the anchor 17 and the polysilicon gauge resistor 4b depend on the alignment accuracy on the front surface side, and since the alignment accuracy is high, high overlay accuracy can be achieved.

After the etching of the sacrificial layer 16 and the like, the structure obtained in the process so far is rinsed and dried. At that time, the diaphragm stopper 12 prevents the diaphragm body 11 and the silicon substrate 1 from being fixed to each other.

After that, the second metal layer 22 is formed, being in contact with the first metal layer 21, filling the etching solution introduction hole 15 to vacuum seal the space 13, and serving as the electrode pad 22b. In the first preferred embodiment, in order to make the space 13 below the polysilicon diaphragm 6 vacuum, the second metal layer 22 made of aluminum (Al) is so deposited by sputtering or evaporation as to have a film thickness of about 0.5 to 10 μm, and then the etching solution introduction hole 15 is filled with the second metal layer 22 under a vacuum atmosphere in this process step. At that time, the second metal layer 22 is brought into contact with the first metal layer 21 in the polysilicon wire contact portions 5a. Then, the second metal layer 22 is patterned.

Finally, the glass coat 23 for protecting the second metal layer 22 is so deposited by plasma CVD as to have a film thickness of about 0.5 to 1.0 μm and patterned to have openings 23a from which the sealing portion 22a is exposed. Further, when it is intended to reduce the wafer thickness, after the fourth insulating film 7 is formed, processing for thinning the wafer is performed.

Thus, in the semiconductor pressure sensor and the method of manufacturing the semiconductor pressure sensor in accordance with the first preferred embodiment, the diaphragm body 11 is formed of the multilayer structure which allows the control over the film thickness, the configuration, and the alignment with high accuracy. Therefore, it is possible to suppress the variation in the performance of the semiconductor pressure sensor, which is caused by downsizing. Further, since the diaphragm stopper 12 protrudes to support the portion near the center of the diaphragm body 11, which is apt to be distorted, this makes it possible to prevent the diaphragm body 11 from being broken and allows thinning and downsizing of the diaphragm body 11. Furthermore, since the polysilicon gauge resistors 4b are disposed on the side of the vacuum chamber (space) 13 below the polysilicon diaphragm 6, the polysilicon gauge resistors 4b resist being affected by the external environment. Therefore, a highly reliable semiconductor pressure sensor can be provided. Further, by only one etching using the etching solution, the space 13 which is to serve as the vacuum chamber is formed. Since the space 13 is formed adjacently to the sacrificial layer 16, it is possible to increase the cross-sectional area of the channel in which the etching solution, washing water, air, and the like are carried. Therefore, since the flow of the etching solution, washing water, air, and the like increases, it is possible to reduce the time required for the process steps of etching, rinsing, drying, and the like and thereby reduce the time required for manufacturing the semiconductor pressure sensor.

No etching hole used for, for example, etching the sacrificial layer 16 is formed in the polysilicon diaphragm 6 and formation of the second metal layer 22 and the glass coat 23 is stopped at some midpoint of the anchor 17. The diaphragm body 11 is formed of the multilayer structure of which the film thickness is thin and uniform. Therefore, it is possible to form the diaphragm body 11 with good uniformity and reduce the film stress upon the diaphragm body 11 given by the second metal layer 22 and the like.

Further, in the semiconductor pressure sensor and the method of manufacturing the semiconductor pressure sensor in accordance with the first preferred embodiment, the second metal layer 22 is formed, being in contact with the first metal layer 21 in the polysilicon wire contact portions 5a, to vacuum seal the space 13 and serve as the electrode pad 22b. Since this allows connection of the first metal layer 21, sealing of the space 13, and the like to be performed at the same time, it is possible to reduce the number of process steps. Therefore, the process for manufacturing the semiconductor pressure sensor can be simplified.

Furthermore, in the semiconductor pressure sensor and the method of manufacturing the semiconductor pressure sensor in accordance with the first preferred embodiment, the tip portion of the diaphragm stopper 12 has a cross shape in a plan view. Therefore, it is possible to surely prevent the diaphragm body 11 from being broken.

In the semiconductor pressure sensor and the method of manufacturing the semiconductor pressure sensor in accordance with the first preferred embodiment, the width of the tip portion of the diaphragm stopper 12 is 5 µm or less. Therefore, it is possible to suppress the diaphragm body 11 from being fixed to the diaphragm stopper 12 after the etching of the sacrificial layer 16.

The Second Preferred Embodiment

FIG. 6 is a plan view showing a semiconductor pressure sensor in accordance with the second preferred embodiment of the present invention, and FIGS. 7 to 11 are cross sections taken along lines A-A to E-E of FIG. 6, respectively. FIGS. 12 to 16 are cross sections corresponding to FIGS. 7 to 11, respectively, showing the state before etching using an etching solution in a process of manufacturing the semiconductor pressure sensor in accordance with the second preferred embodiment. Hereinafter, discussion will be made on the semiconductor pressure sensor of the second preferred embodiment of the present invention, centering on a difference from the semiconductor pressure sensor of the first preferred embodiment, where the constituent elements identical to those of the semiconductor pressure sensor of the first preferred embodiment will be represented by the same reference signs.

Figure 9:
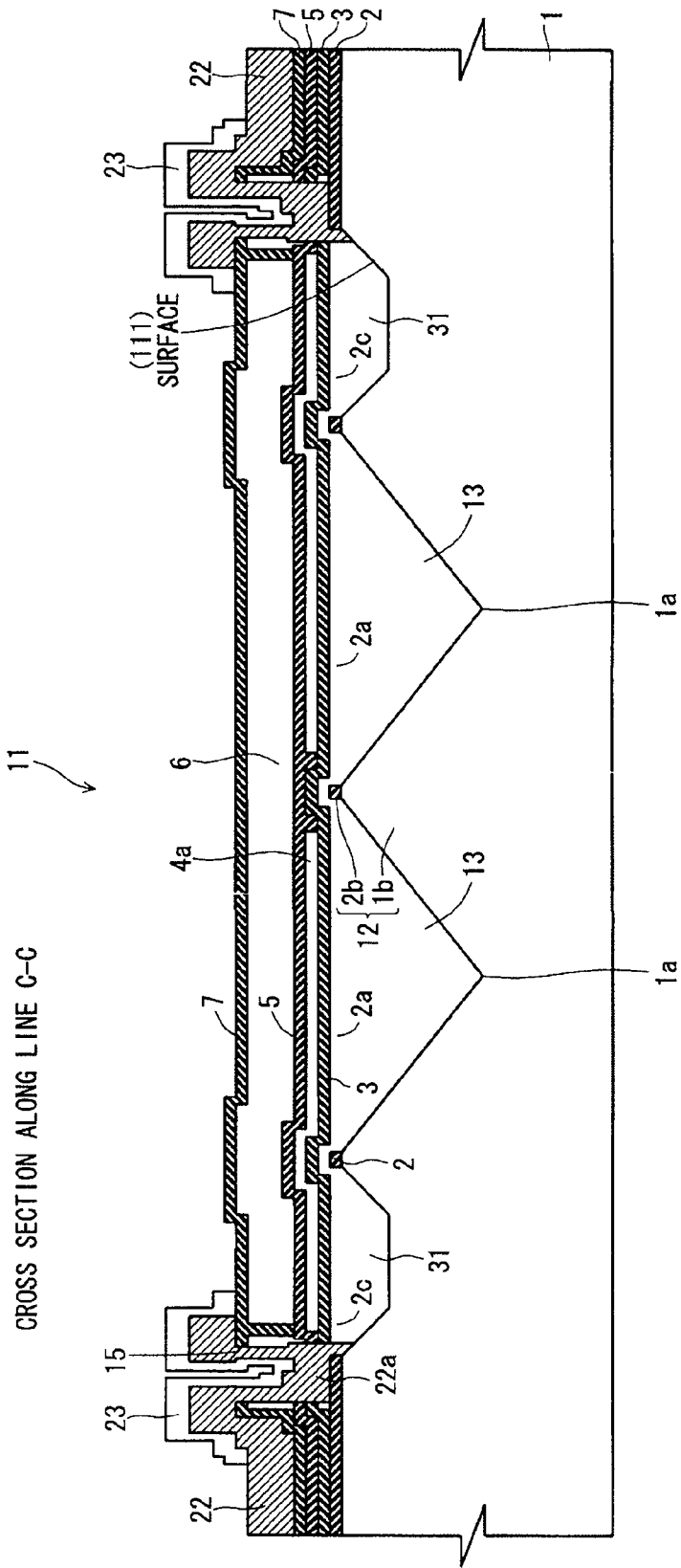
FIG. 9 is a cross section showing the semiconductor pressure sensor in accordance with the second preferred embodiment, taken along a line C-C of FIG. 6.
Figure 10:
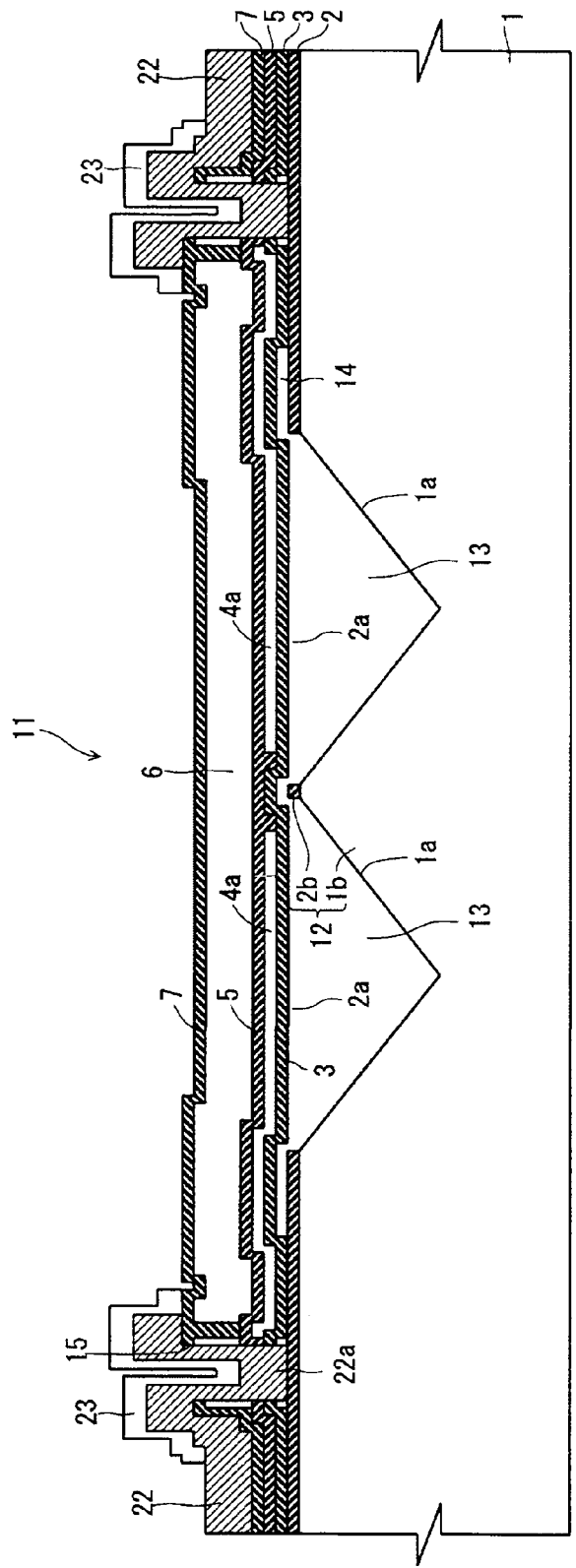
FIG. 10 is a cross section showing the semiconductor pressure sensor in accordance with the second preferred embodiment, taken along a line D-D of FIG. 6.
Figure 11:
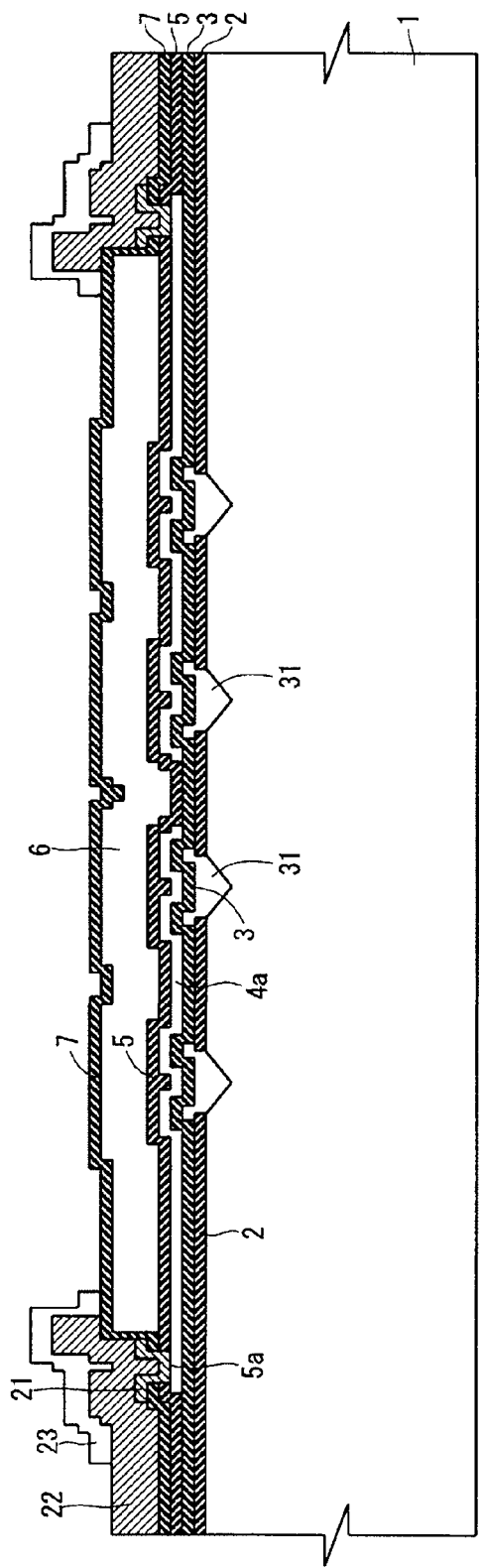
FIG. 11 is a cross section showing the semiconductor pressure sensor in accordance with the second preferred embodiment, taken along a line E-E of FIG. 6.
Figure 12:
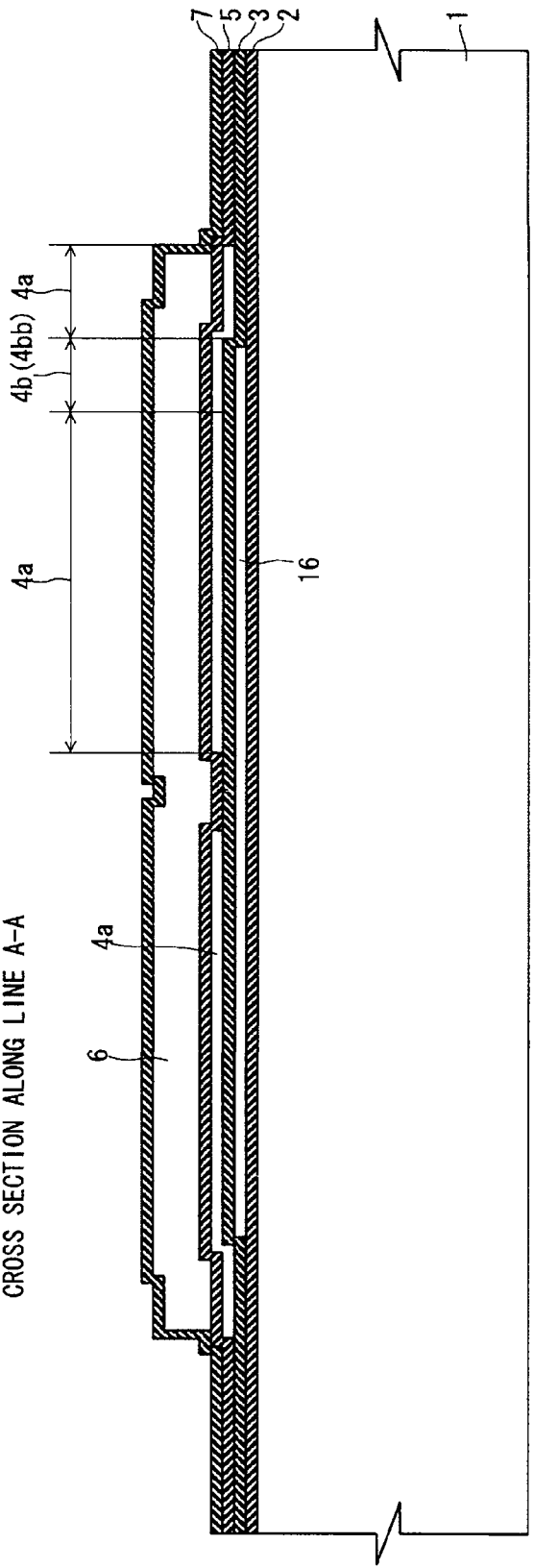
FIGS. 12 to 16 are cross sections showing process steps of manufacturing the semiconductor pressure sensor in accordance with the second preferred embodiment.
Figure 13:
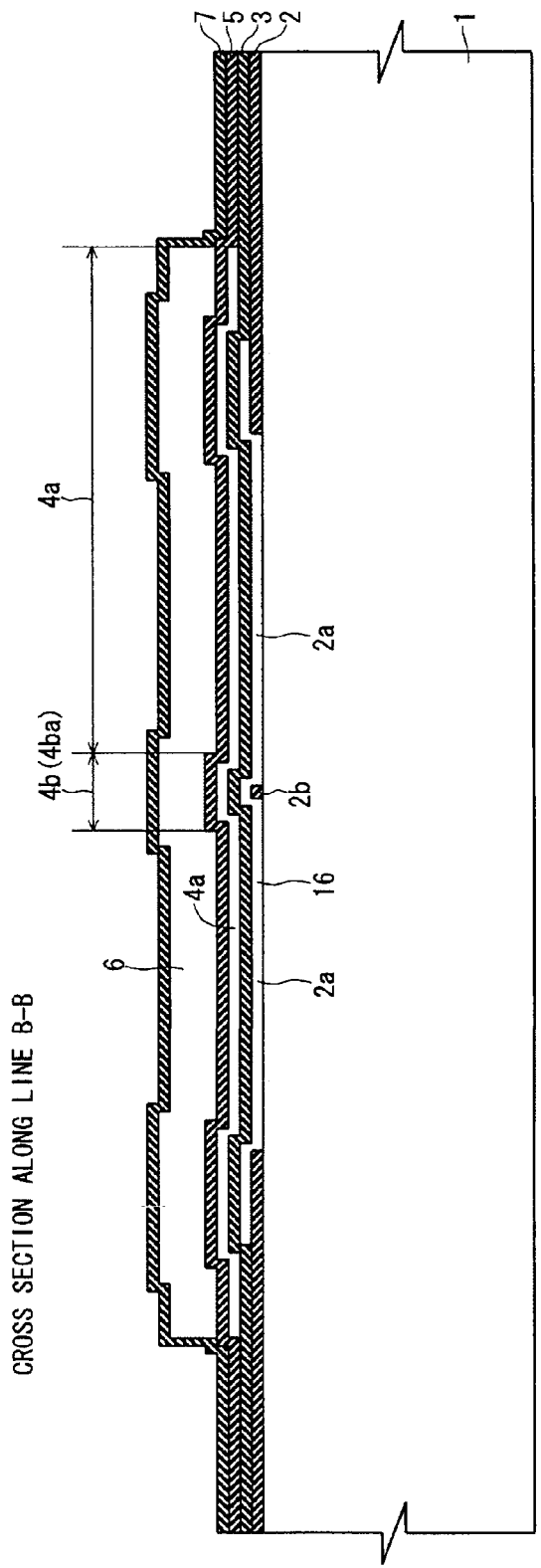
Figure 14:
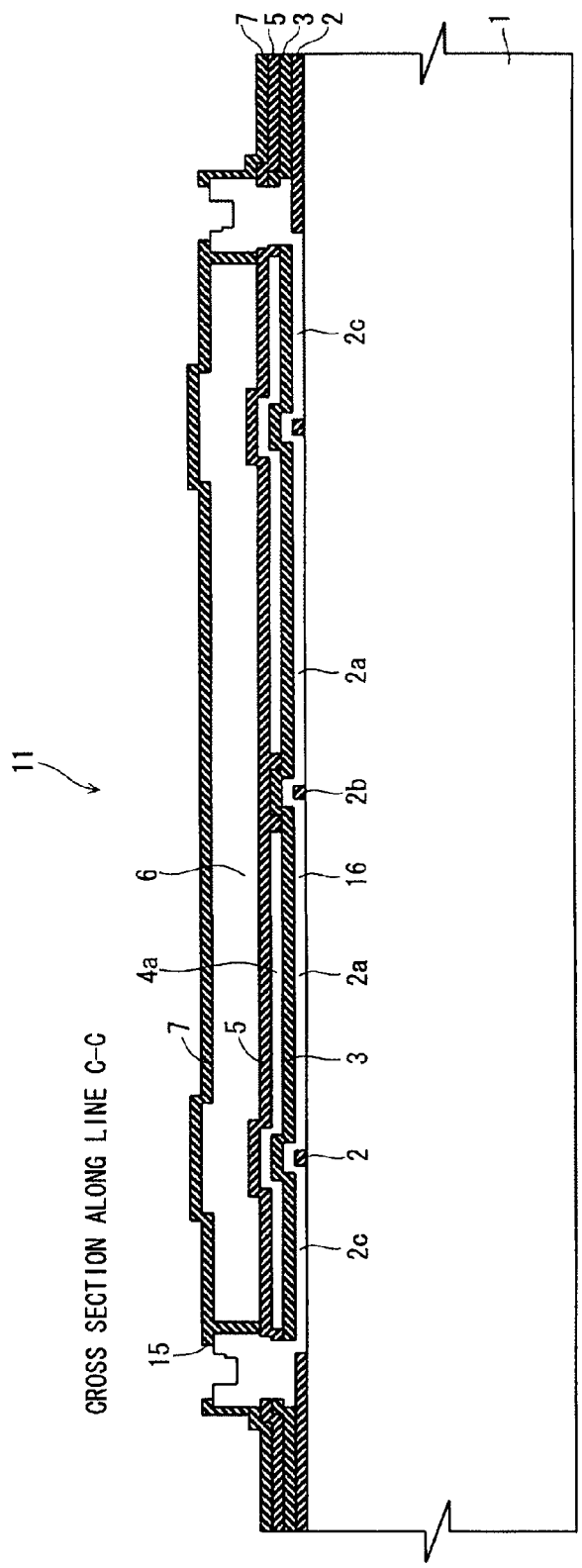
Figure 15:
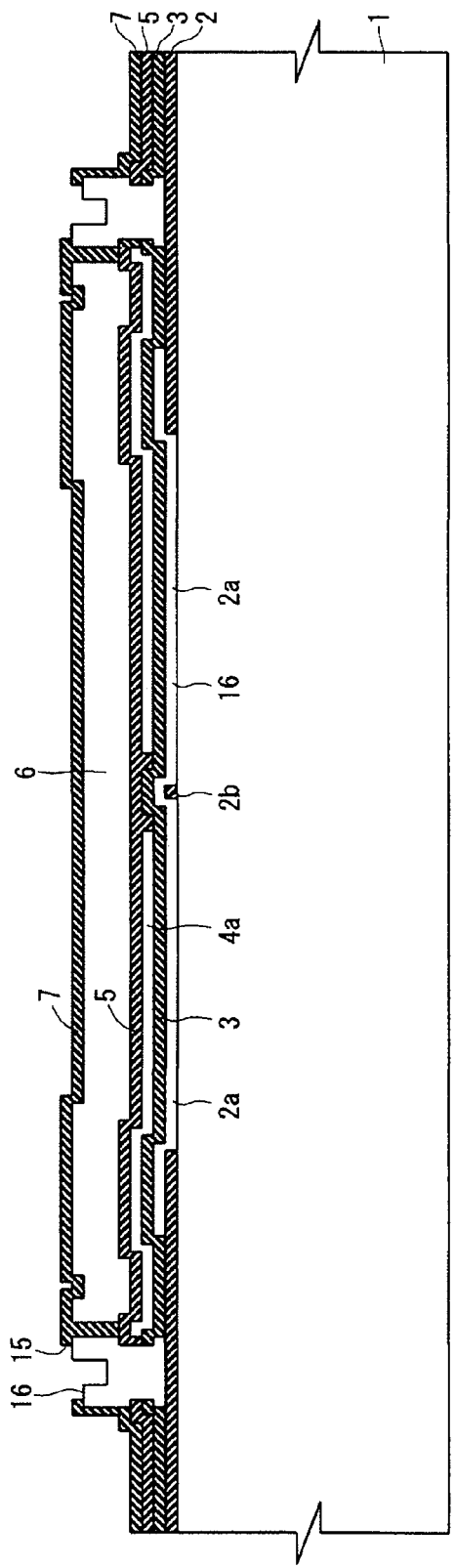
Figure 16:
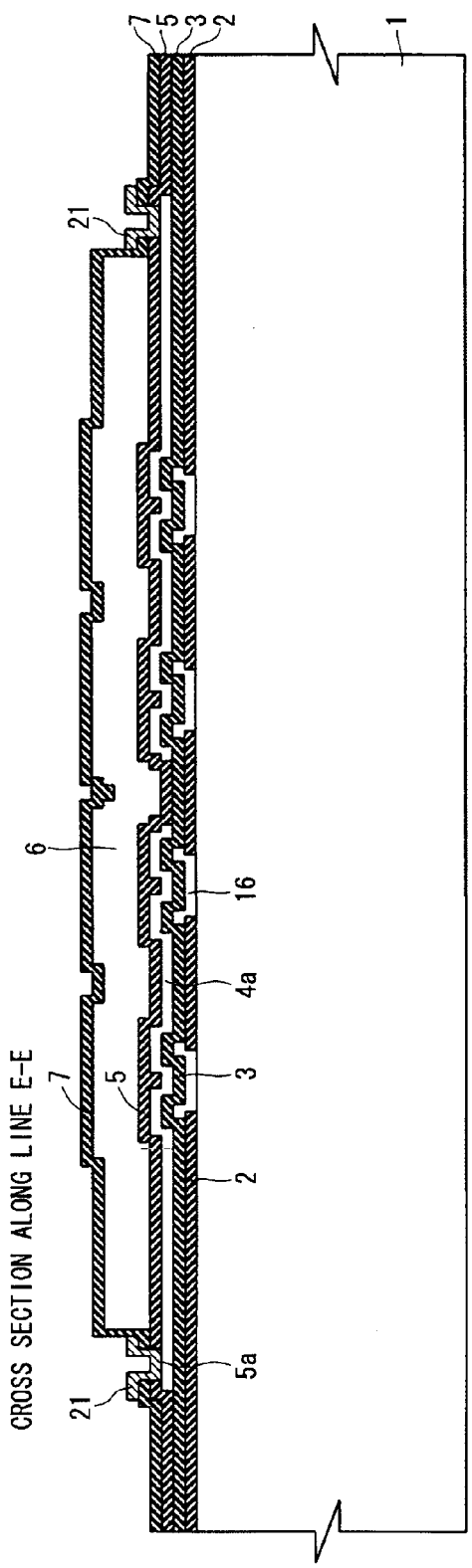

As shown in FIGS. 6, 9, and 11, in the semiconductor pressure sensor of the second preferred embodiment, the first insulating film 2 further has a plurality of second openings 2c which are formed outside the plurality of first openings 2a in a plan view (FIG. 6) and communicate with the etching solution introduction hole 15. Then, a V-shaped small channel 31 (first channel) adjacent to the second opening 2c is formed in the silicon substrate 1 as part of the space 13. In the second preferred embodiment, since an etching solution or the like is carried in the small channel 31, it is possible to increase the flow of the etching solution or the like as compared with the flow in the first preferred embodiment.

Hereinafter, discussion will be made on a method of manufacturing the semiconductor pressure sensor in accordance with the second preferred embodiment. First, like in the first preferred embodiment, the silicon substrate 1 having a main surface of which crystal orientation is (100) is prepared.

Then, in the same manner as that of the first preferred embodiment, the first insulating film 2 is formed on the main surface of the silicon substrate 1. In the second preferred embodiment, however, the first insulating film 2 has not only the plurality of first openings 2a but also the plurality of second openings 2c formed outside the first openings 2a in the plan view (FIG. 6). Specifically, each of the plurality of second openings 2c is formed between the adjacent two of the plurality of anchors 17.

Next, in the same manner as that of the first preferred embodiment, the sacrificial layer 16 is formed on the first insulating film 2. In the second preferred embodiment, however, the sacrificial layer 16 is so formed as to come in contact with the silicon substrate 1 not only in the plurality of first openings 2a but also in the plurality of second openings 2c.

Then, in the same manner as that of the first preferred embodiment, the above-discussed multilayer structure is formed on the sacrificial layer 16. In the second preferred embodiment, however, the etching solution introduction hole 15 of the group of insulating films (consisting of the second insulating film 3, the third insulating film 5, and the fourth insulating film 7) communicates with each of the plurality of second openings 2c of the first insulating film 2.

In this state, in the same manner as that of the first preferred embodiment, an etching solution is supplied through the etching solution introduction hole 15 and isotropic etching of the sacrificial layer 16 is performed to thereby obtain the diaphragm body 11 formed of the multilayer structure and form the space 13, the air gap 14, and the diaphragm stopper 12. In the second preferred embodiment, at that time, the etching solution carried in the etching solution introduction hole 15 reaches the second openings 2c of the first insulating film 2 to come into contact with the silicon substrate 1. As a result, the surface of the silicon substrate 1 under the second openings 2c is anisotropically etched with the etching solution, to thereby form the small channel 31 in the silicon substrate 1 as part of the space 13. After that, like in the first preferred embodiment, the second metal layer 22 vacuum seals the space 13 and the glass coat 23 is formed.

Thus, in the semiconductor pressure sensor and the method of manufacturing the semiconductor pressure sensor in accordance with the second preferred embodiment, the small channel 31 is formed during the etching of the sacrificial layer 16. This increases the cross-sectional area of a portion, which is small in the first preferred embodiment, in the channel in which the etching solution or the like is carried (between the space 13 and the etching solution introduction hole 15 shown in FIG. 9). Therefore, since the flow of the etching solution or the like increases, it is possible to reduce the time required for manufacturing the semiconductor pressure sensor. Further, as to other than the above, the same effects as those in the first preferred embodiment can be produced.

As shown in FIGS. 6 and 9, in the second preferred embodiment, the silicon substrate 1 has a crystal orientation (111) surface adjacent to the vacuum chamber 13 (herein, the small channel 31). In this case, by forming the multilayer structure so that the end portion of the surface can overlap the etching solution introduction hole 15 in the plan view, it is possible to increase the cross-sectional area of the channel in which the etching solution or the like is carried. Therefore, it is possible to further reduce the time required for manufacturing the semiconductor pressure sensor. Further, the sealing performance of the space 13 with the second metal layer 22 (the sealing portion 22a) can be also increased.

The Third Preferred Embodiment

Figure 17:
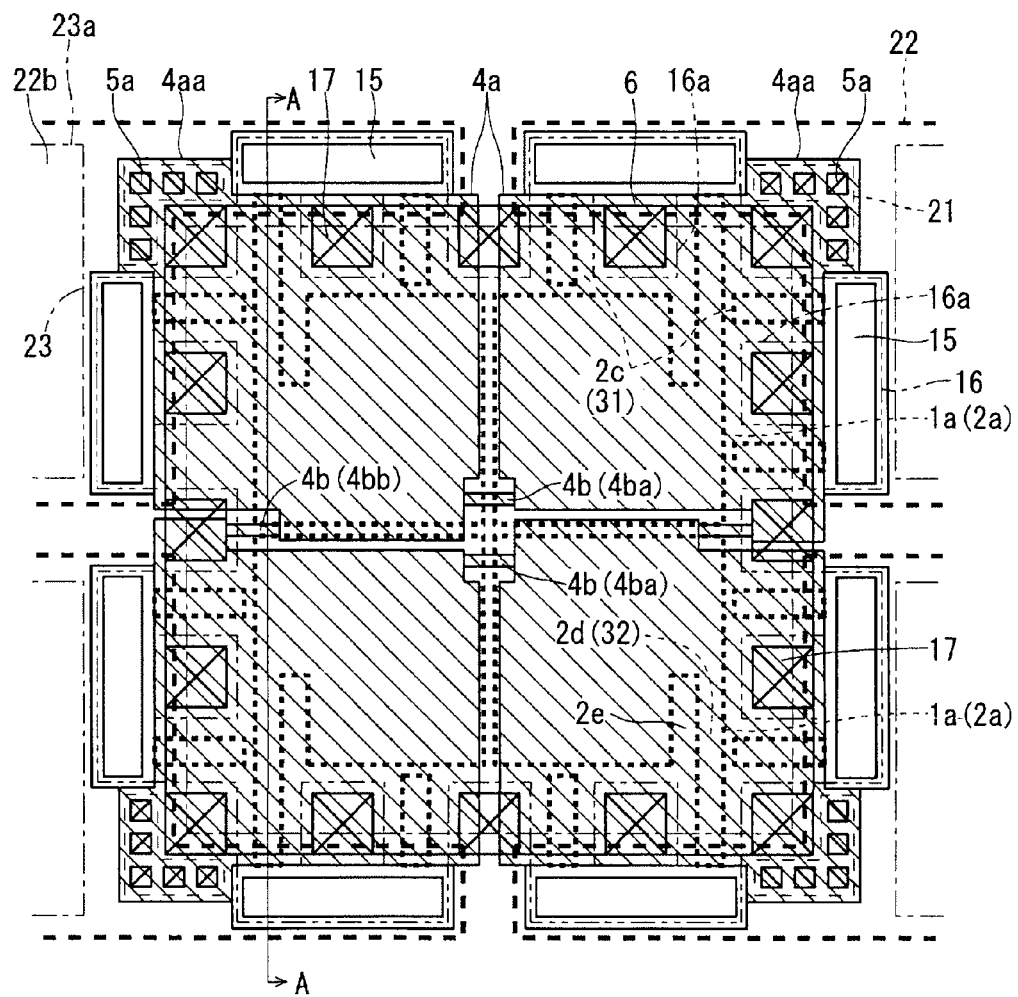
FIG. 17 is a plan view showing a semiconductor pressure sensor in accordance with a third preferred embodiment.
Figure 18:
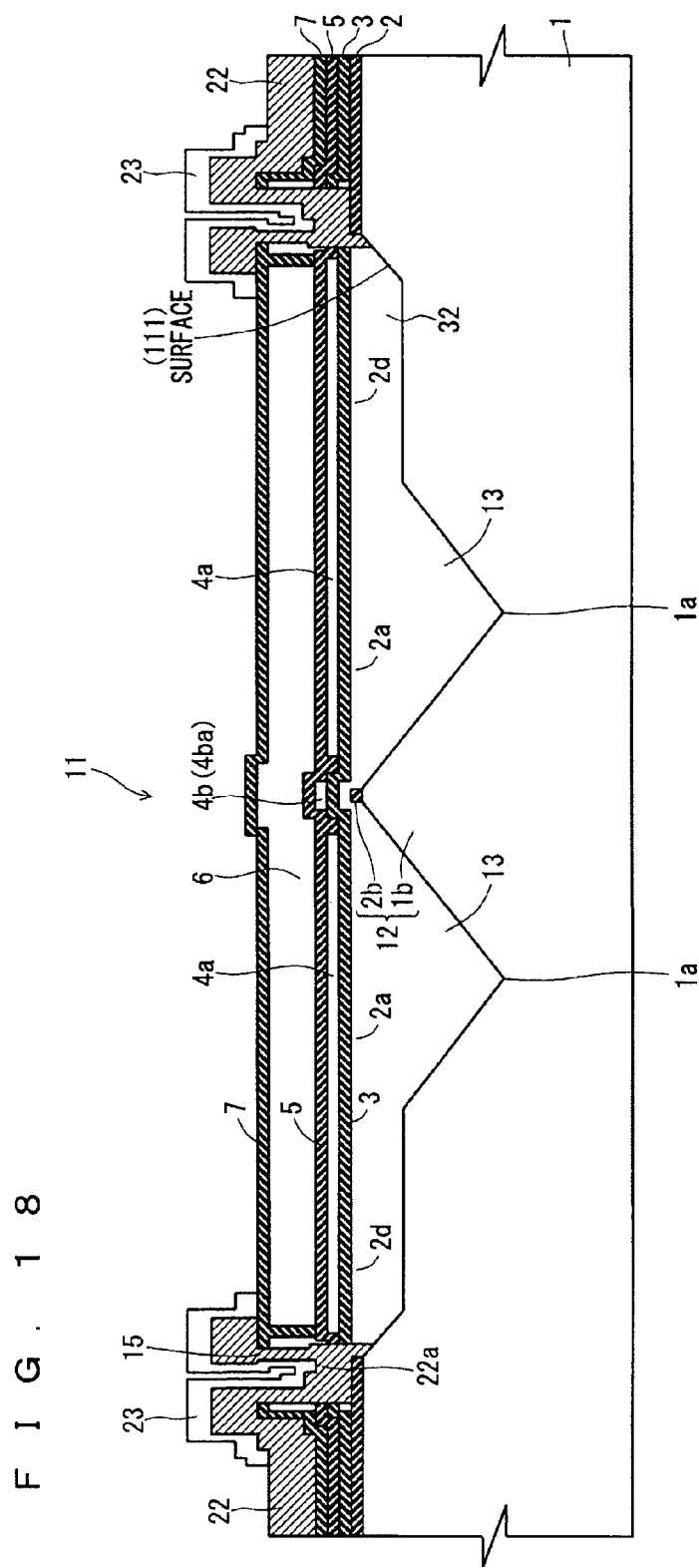
FIG. 18 is a cross section showing the semiconductor pressure sensor in accordance with the third preferred embodiment, taken along a line A-A of FIG. 17.
Figure 19:
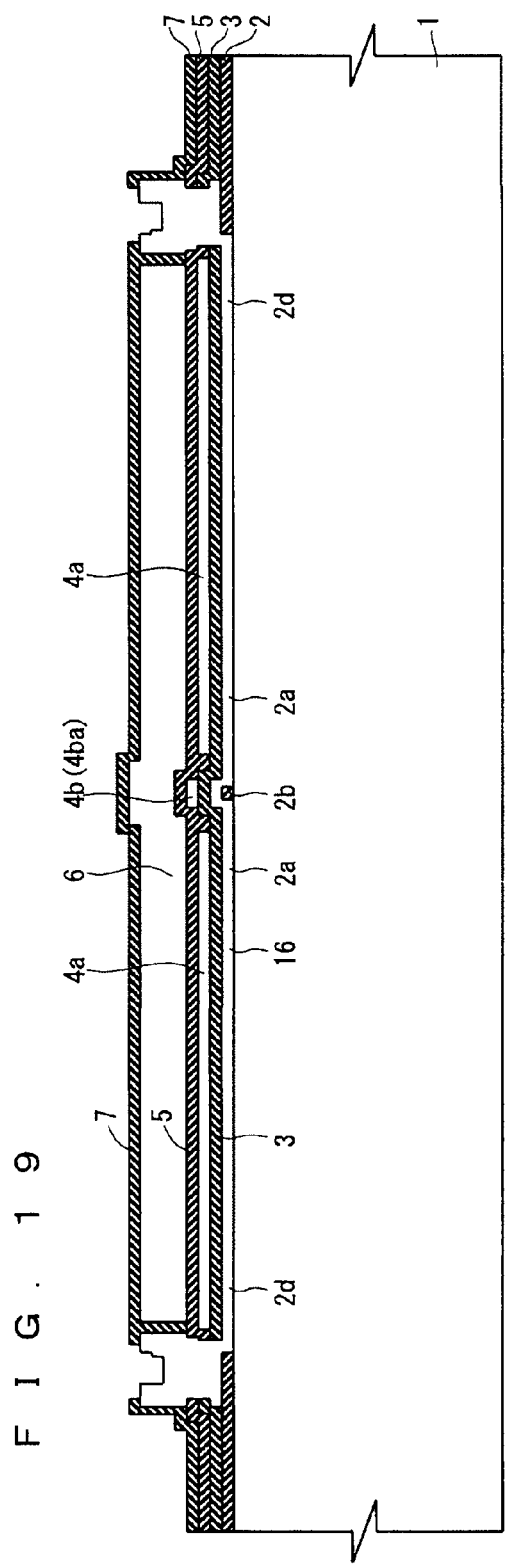
FIG. 19 is a cross section showing a process of manufacturing the semiconductor pressure sensor in accordance with the third preferred embodiment.

FIG. 17 is a plan view showing a semiconductor pressure sensor in accordance with the third preferred embodiment of the present invention, and FIG. 18 is a cross section taken along a line A-A of FIG. 17. FIG. 19 is a cross section corresponding to FIG. 18, showing the state before etching using an etching solution in a process of manufacturing the semiconductor pressure sensor in accordance with the third preferred embodiment. Hereinafter, discussion will be made on the semiconductor pressure sensor of the third preferred embodiment of the present invention, centering on a difference from the semiconductor pressure sensor of the second preferred embodiment, where the constituent elements identical to those of the semiconductor pressure sensor of the second preferred embodiment will be represented by the same reference signs.

As shown in FIGS. 17 and 19, in the semiconductor pressure sensor of the third preferred embodiment, each of the first openings 2a of the first insulating film 2 protrudes outward in a plan view, having a protruding portion 2d communicating with the etching solution introduction hole 15. Then, a medium channel 32 (second channel) adjacent to the protruding portion 2d is formed in the silicon substrate 1 as part of the space 13. In the third preferred embodiment, since an etching solution or the like is carried in the medium channel 32, it is possible to further increase the flow of the etching solution or the like as compared with the flow in the second preferred embodiment.

Hereinafter, discussion will be made on a method of manufacturing the semiconductor pressure sensor in accordance with the third preferred embodiment. First, like in the second preferred embodiment, the silicon substrate 1 having a main surface of which crystal orientation is (100) is prepared.

Then, in the same manner as that of the second preferred embodiment, the first insulating film 2 is formed on the main surface of the silicon substrate 1. In the third preferred embodiment, however, each of the first openings 2a of the first insulating film 2 has the protruding portion 2d protruding outward in the plan view (FIG. 17). Specifically, each of the protruding portions 2d is formed between the adjacent two of the plurality of anchors 17.

Next, in the same manner as that of the second preferred embodiment, the sacrificial layer 16 is formed on the first insulating film 2.

Then, in the same manner as that of the second preferred embodiment, the above-discussed multilayer structure is formed on the sacrificial layer 16. In the third preferred embodiment, however, the etching solution introduction hole 15 of the group of insulating films (consisting of the second insulating film 3, the third insulating film 5, and the fourth insulating film 7) communicates with the protruding portion 2d of the first opening 2a.

In this state, in the same manner as that of the second preferred embodiment, an etching solution is supplied through the etching solution introduction hole 15 and isotropic etching of the sacrificial layer 16 is performed to thereby obtain the diaphragm body 11 formed of the multilayer structure and form the space 13, the air gap 14, the diaphragm stopper 12, and the small channel 31. In the third preferred embodiment, at that time, the etching solution carried in the etching solution introduction hole 15 reaches the protruding portion 2d of the first opening 2a to come into contact with the silicon substrate 1. As a result, the surface of the silicon substrate 1 under the protruding portion 2d is anisotropically etched with the etching solution, to thereby form the medium channel 32 in the silicon substrate 1 as part of the space 13. After that, like in the second preferred embodiment, the second metal layer 22 vacuum seals the space 13 and the glass coat 23 is formed.

Thus, in the semiconductor pressure sensor and the method of manufacturing the semiconductor pressure sensor in accordance with the third preferred embodiment, the medium channel 32 is formed during the etching of the sacrificial layer 16. This increases the cross-sectional area of a portion, which is small in the second preferred embodiment, in the channel in which the etching solution or the like is carried (between the space 13 and the etching solution introduction hole 15 shown in FIG. 18). Therefore, since the flow of the etching solution or the like increases, it is possible to reduce the time required for manufacturing the semiconductor pressure sensor. Further, as to other than the above, the same effects as those in the first preferred embodiment can be produced.

Like in the second preferred embodiment, in the third preferred embodiment, the silicon substrate 1 also has a crystal orientation (111) surface adjacent to the vacuum chamber 13 (herein, the medium channel 32). In this case, by forming the multilayer structure so that the end portion of the surface can overlap the etching solution introduction hole 15 in the plan view, it is possible to increase the cross-sectional area of the channel in which the etching solution or the like is carried. Therefore, it is possible to further reduce the time required for manufacturing the semiconductor pressure sensor and increase the sealing performance of the space 13 with the second metal layer 22 (the sealing portion 22a).

In the third preferred embodiment, there is a possibility that it may be difficult to form a designed pattern on the silicon substrate 1 with accuracy since formation of the medium channel 32 may excessively increase the flow of the etching solution to cause an increase in the side etching rate. Then, in the third preferred embodiment, a medium channel compensation pattern 2e which is a side etching preventing compensation pattern for suppressing the side etching of the silicon substrate 1 during the etching of the sacrificial layer 16 and the like is provided in the first opening 2a of the first insulating film 2. Therefore, it is possible to suppress the side etching of the silicon substrate 1 and form a designed pattern (desired pattern) with accuracy. In the third preferred embodiment, the medium channel compensation pattern 2e is formed by patterning the insulating film at the same time as the first insulating film 2 is formed.

Further, if the etching pattern in the crystal anisotropic etching is not a rectangle like in the third preferred embodiment, a shape obtained by the etching becomes complicated. For this reason, if it is difficult to predict a final shape, there may be a structure in which only the small channel 31 is additionally formed, like in the second preferred embodiment.

The Fourth Preferred Embodiment

Figure 20:
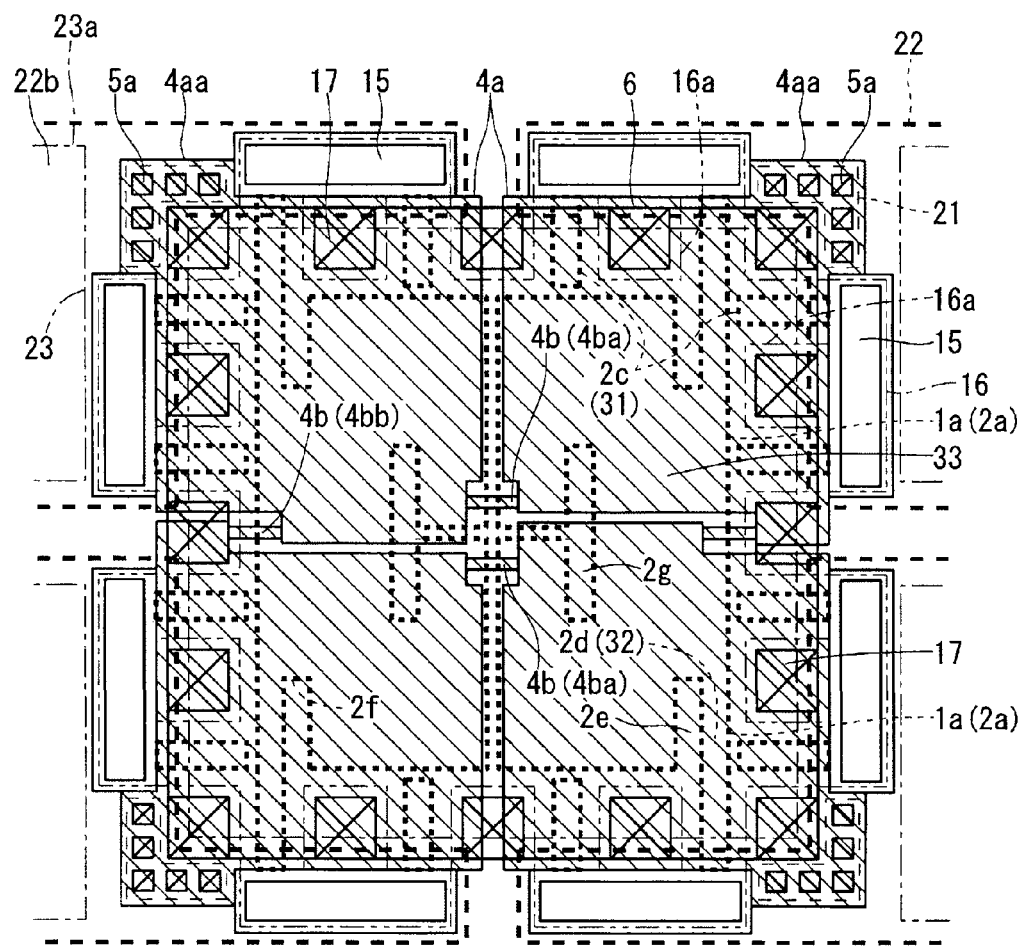
FIGS. 20 and 21 are plan views each showing a semiconductor pressure sensor in accordance with a fourth preferred embodiment.
Figure 21:
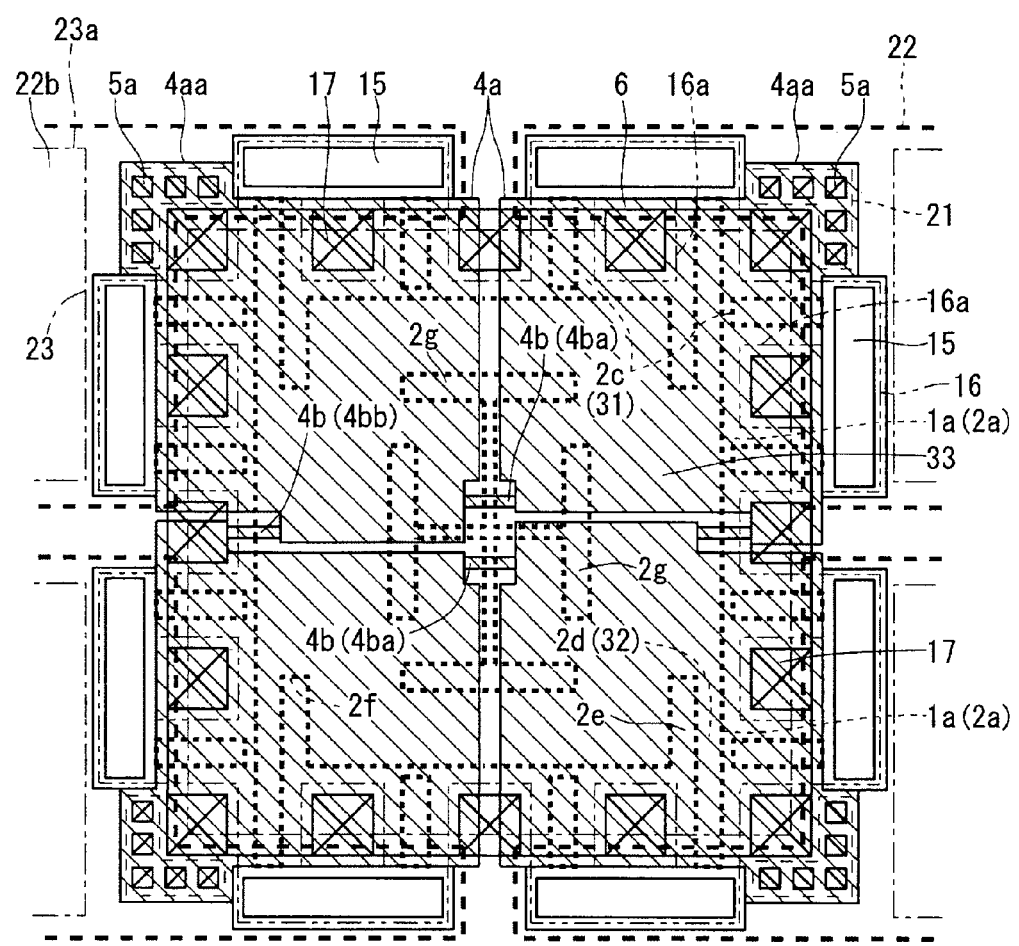

FIGS. 20 and 21 are plan views each showing a semiconductor pressure sensor in accordance with the fourth preferred embodiment of the present invention. Hereinafter, discussion will be made on the semiconductor pressure sensor of the fourth preferred embodiment of the present invention, centering on a difference from the semiconductor pressure sensor of the third preferred embodiment, where the constituent elements identical to those of the semiconductor pressure sensor of the third preferred embodiment will be represented by the same reference signs.

As shown in FIGS. 20 and 21, in the semiconductor pressure sensor of the fourth preferred embodiment, on the above-discussed surface of the silicon substrate 1, formed is, instead of the plurality of recesses 1a, one recess 1a partially combining the recesses 1a. The first insulating film 2 has, instead of the plurality of first openings 2a, a third opening 2f formed partially combining the first openings 2a. Specifically, the first insulating film 2 shown in FIG. 20 has, instead of the two longitudinally adjacent first openings 2a, the third opening 2f formed partially combining these first openings 2a. The first insulating film 2 shown in FIG. 21 has, instead of the four longitudinally or laterally adjacent first openings 2a, the third opening 2f formed partially combining these first openings 2a.

In the semiconductor pressure sensor and the method of manufacturing the semiconductor pressure sensor in accordance with the fourth preferred embodiment, it is possible to increase the channel in which the etching solution or the like is carried, which is formed along the sacrificial layer 16 during the above-discussed etching of the sacrificial layer 16. In other words, a large channel 33 can be formed and this increases the flow of the etching solution or the like. Therefore, it is possible to reduce the time required for manufacturing the semiconductor pressure sensor. Further, as to other than the above, the same effects as those in the first preferred embodiment can be produced.

In the fourth preferred embodiment, there is a possibility that it may be difficult to form a designed pattern on the silicon substrate 1 with accuracy since formation of the third opening 2f having a large area may excessively increase the flow of the etching solution to cause an increase in the side etching rate. Then, in the fourth preferred embodiment, a large channel compensation pattern 2g which is a side etching preventing compensation pattern for suppressing the side etching of the silicon substrate 1 during the etching of the sacrificial layer 16 and the like is provided in the third opening 2f. Therefore, it is possible to suppress the side etching of the silicon substrate 1 and form a designed pattern (desired pattern) with accuracy. In the fourth preferred embodiment, the large channel compensation pattern 2g is formed by patterning the insulating film at the same time as the first insulating film 2 is formed.

Further, if the etching pattern in the crystal anisotropic etching is not a rectangle like in the fourth preferred embodiment, a shape obtained by the etching becomes complicated. For this reason, if it is difficult to predict a final shape, there may be a structure in which only the small channel 31 is additionally formed, like in the second preferred embodiment.

The Fifth Preferred Embodiment

Figure 24:
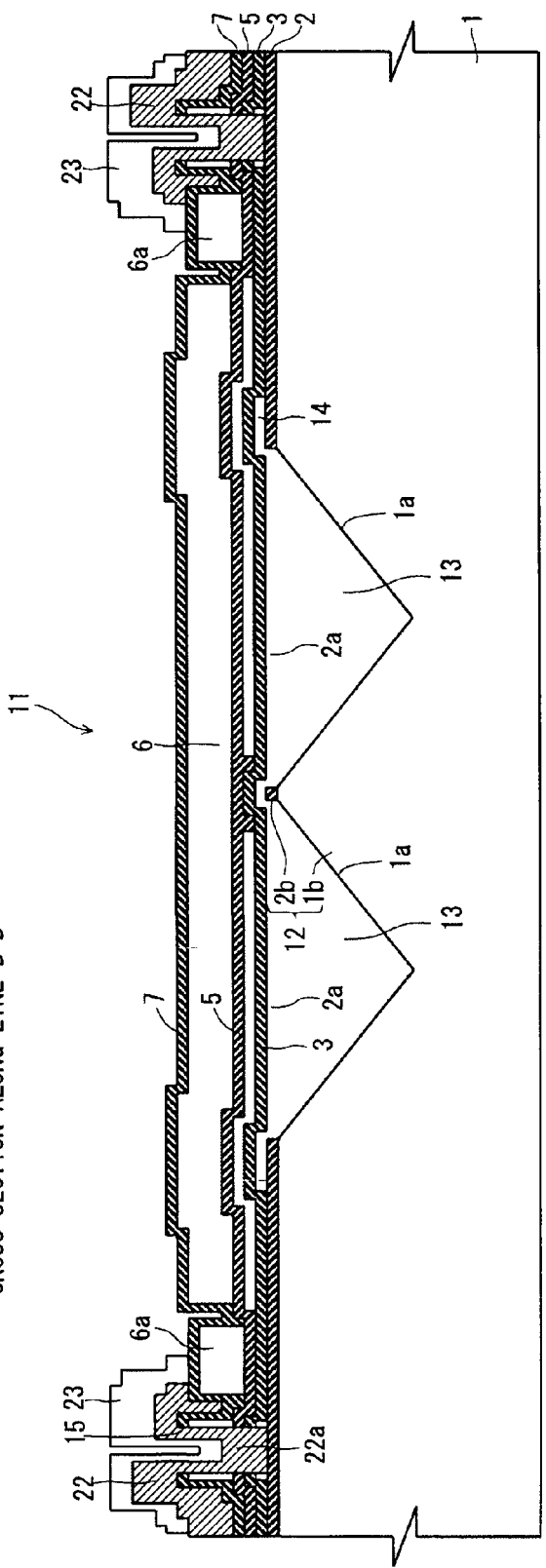
FIG. 24 is a cross section showing the semiconductor pressure sensor in accordance with the fifth preferred embodiment, taken along a line B-B of FIG. 22.
Figure 25:
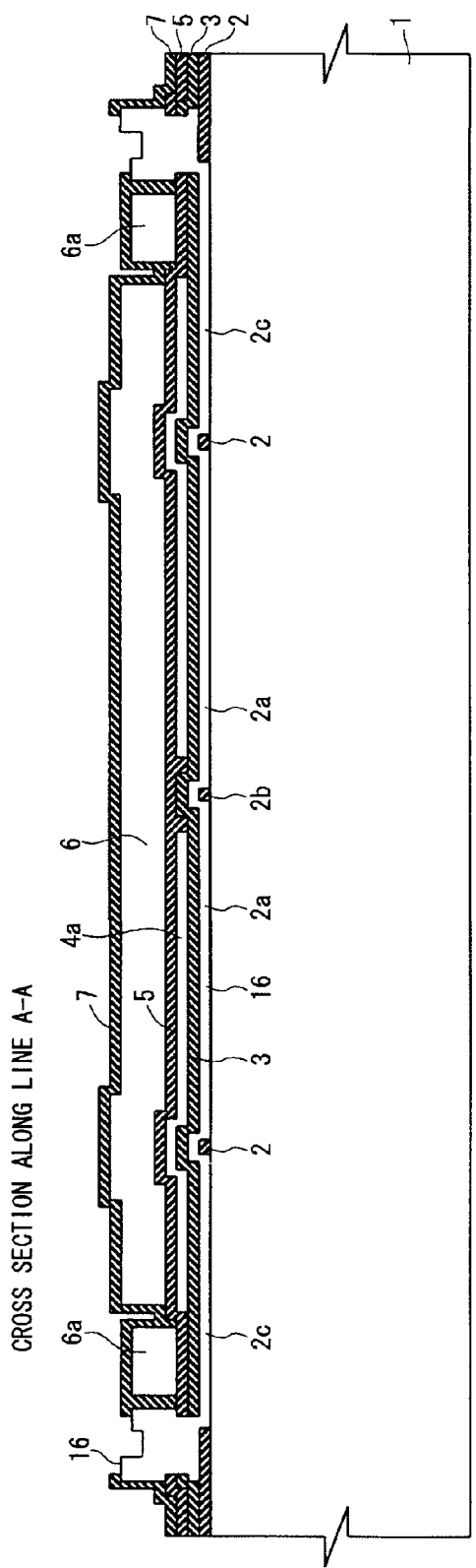
FIGS. 25 and 26 are cross sections showing process steps of manufacturing the semiconductor pressure sensor in accordance with the fifth preferred embodiment.
Figure 26:
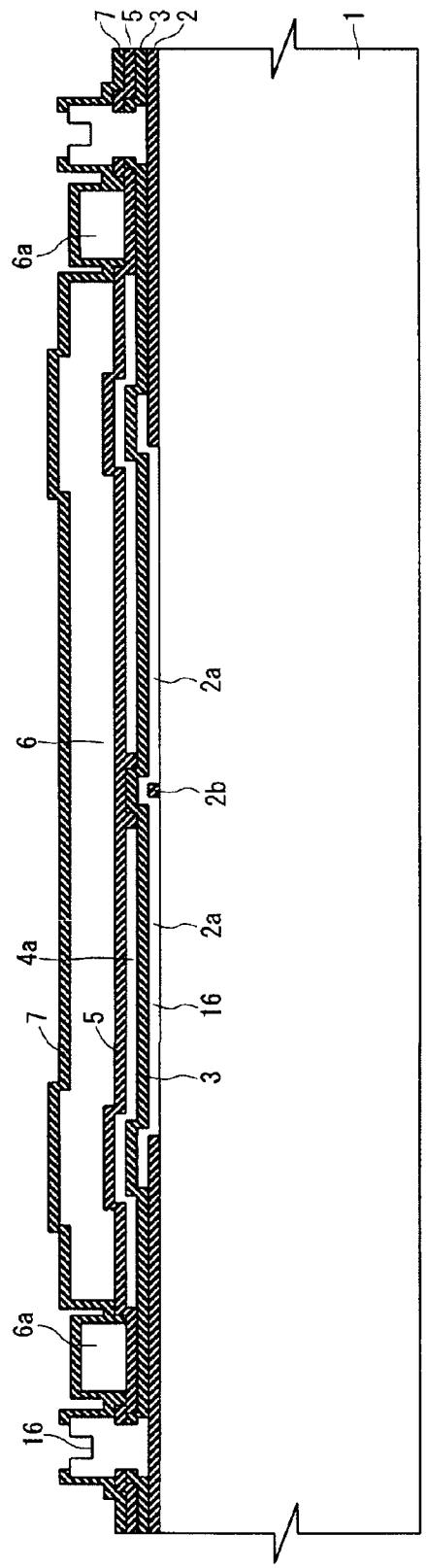

FIG. 22 is a plan view showing a semiconductor pressure sensor in accordance with the fifth preferred embodiment of the present invention, and FIGS. 23 and 24 are cross sections taken along lines A-A and B-B of FIG. 22, respectively. FIGS. 25 and 26 are cross sections corresponding to FIGS. 23 and 24, respectively, showing the state before etching using an etching solution in a process of manufacturing the semiconductor pressure sensor in accordance with the fifth preferred embodiment. Hereinafter, discussion will be made on the semiconductor pressure sensor of the fifth preferred embodiment of the present invention, centering on a difference from the semiconductor pressure sensor of the second preferred embodiment, where the constituent elements identical to those of the semiconductor pressure sensor of the second preferred embodiment will be represented by the same reference signs.

As shown in FIGS. 22 to 26, the diaphragm body 11 (the multilayer structure) further includes an outer frame portion 6a which is contained in the above-described group of insulating films and formed outside the polysilicon wires 4a, the polysilicon gauge resistors 4b, the polysilicon diaphragm 6, and the anchors 17, being away therefrom in a plan view (FIG. 22). The outer frame portion 6a is covered with the fourth insulating film 7 on the third insulating film 5 and formed by patterning a doped polysilicon film at the same time as the polysilicon diaphragm 6 is formed.

The etching solution introduction hole 15 and the second metal layer 22 are formed outside the outer frame portion 6a in the plan view (FIG. 22) and the glass coat 23 is also formed outside the outer frame portion 6a in the plan view (FIG. 22).

In the semiconductor pressure sensor and the method of manufacturing the semiconductor pressure sensor in accordance with the fifth preferred embodiment, the second metal layer 22 and the glass coat 23 which impose a stress on the diaphragm body 11 to a degree do not cover the polysilicon diaphragm 6 and the anchor 17 in the diaphragm body 11. Therefore, the film stress thereof can be reduced and it is thereby possible to provide a highly accurate semiconductor pressure sensor. Further, as to other than the above, the same effects as those in the second preferred embodiment can be produced.

The Sixth Preferred Embodiment

Figure 27:
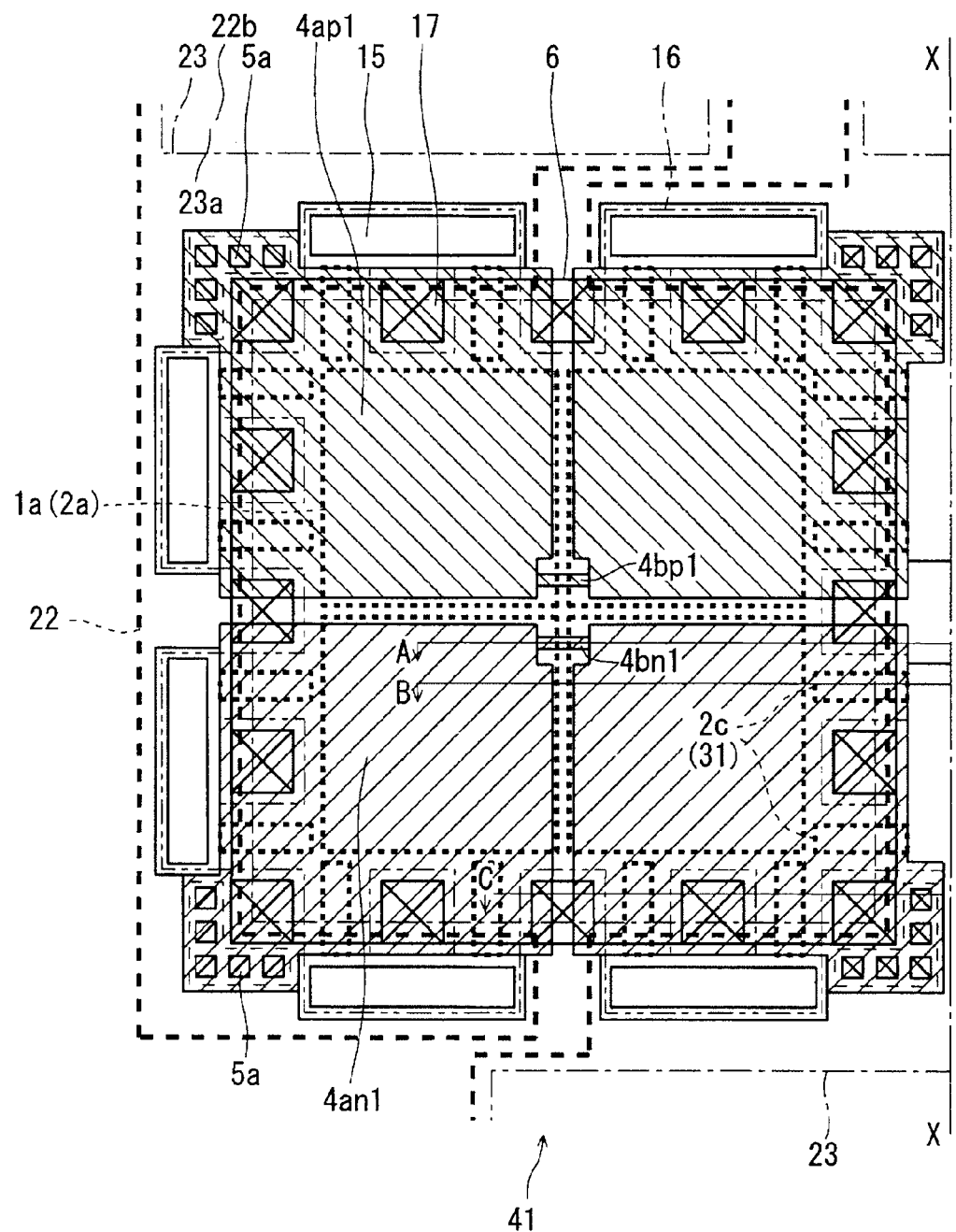
FIGS. 27 and 28 are plan views each showing a semiconductor pressure sensor in accordance with a sixth preferred embodiment.
Figure 28:
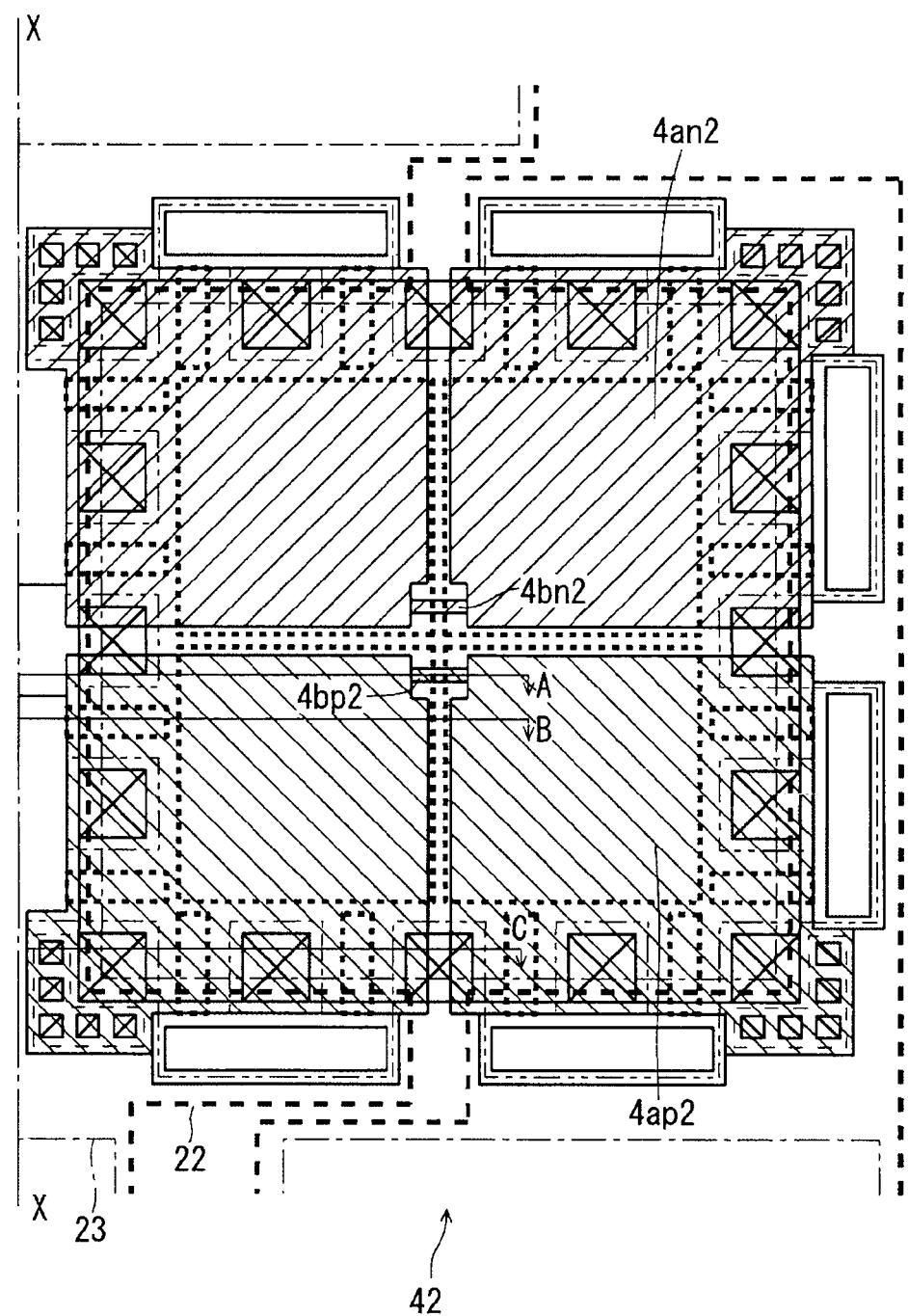
Figure 29:
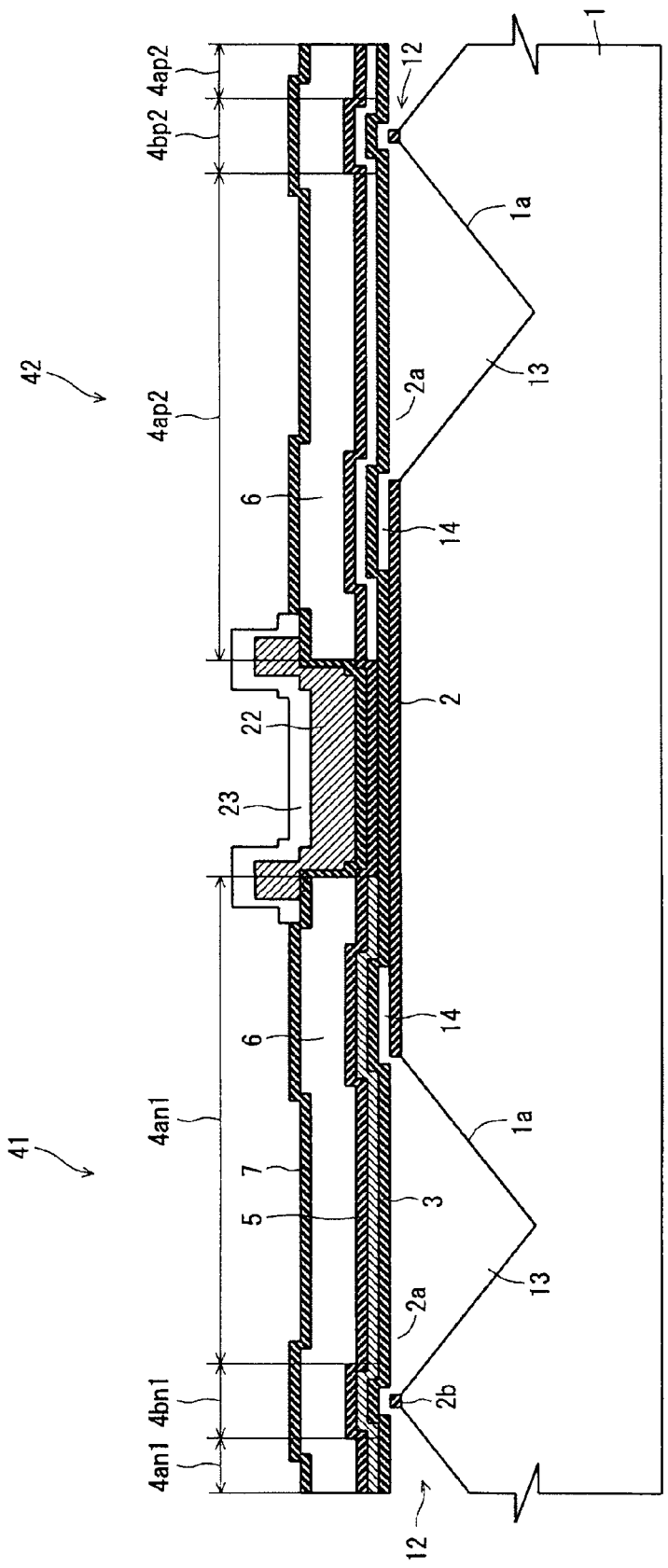
FIG. 29 is a cross section showing the semiconductor pressure sensor in accordance with the sixth preferred embodiment, taken along a line A-A of FIGS. 27 and 28.
Figure 30:
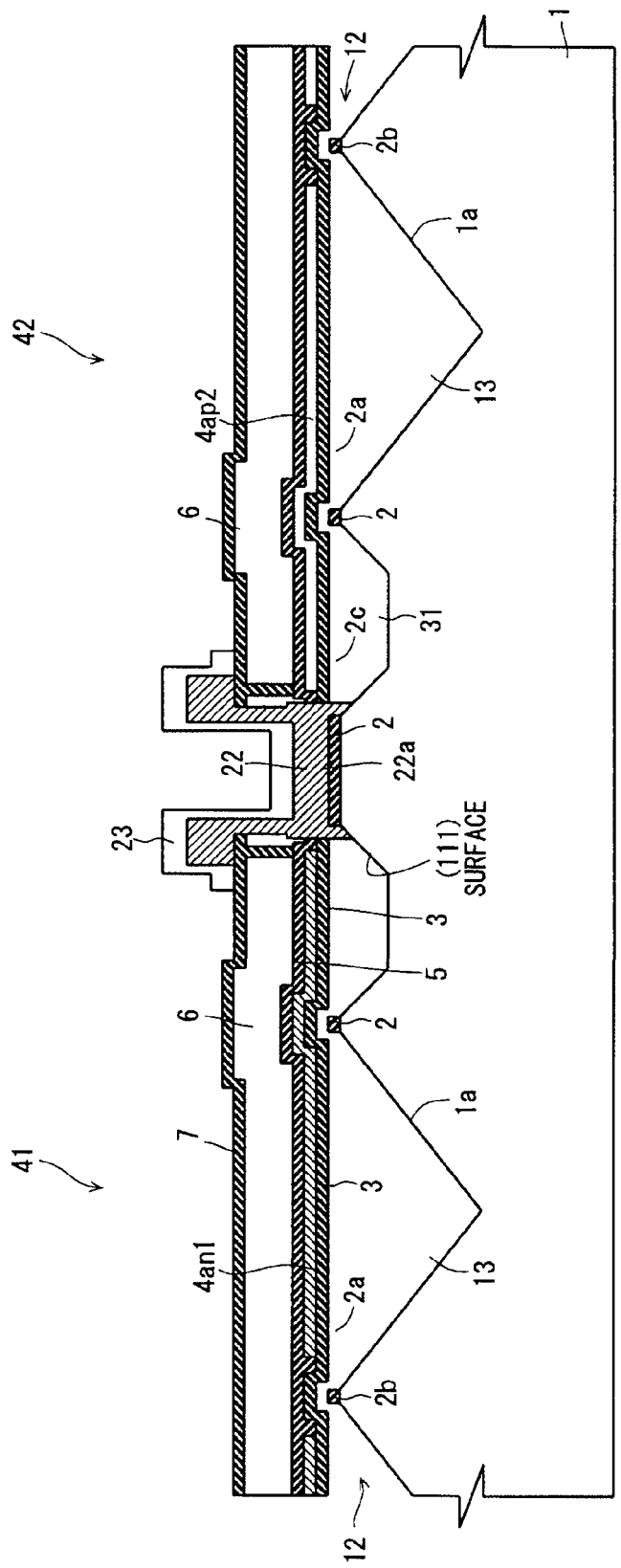
FIG. 30 is a cross section showing the semiconductor pressure sensor in accordance with the sixth preferred embodiment, taken along a line B-B of FIGS. 27 and 28.
Figure 31:
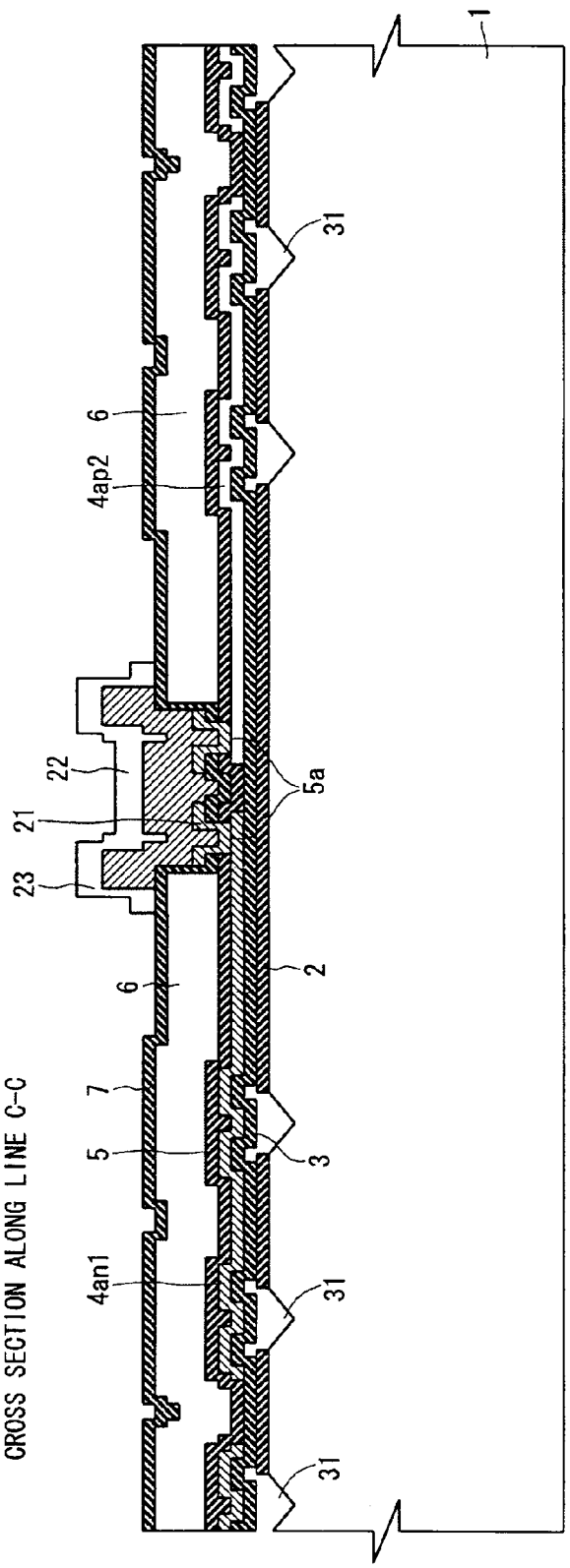
FIG. 31 is a cross section showing the semiconductor pressure sensor in accordance with the sixth preferred embodiment, taken along a line C-C of FIGS. 27 and 28.
Figure 32:
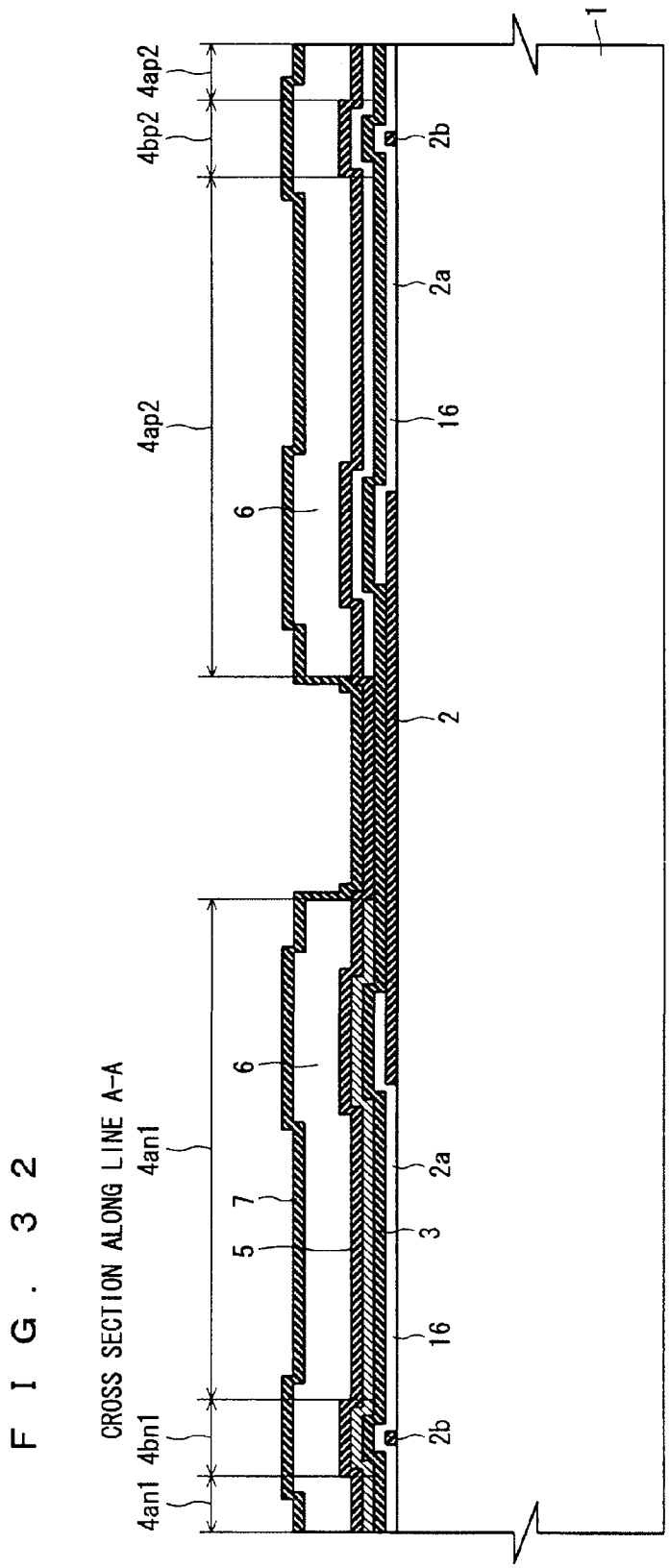
FIGS. 32 to 34 are cross sections showing process steps of manufacturing the semiconductor pressure sensor in accordance with the sixth preferred embodiment.
Figure 33:
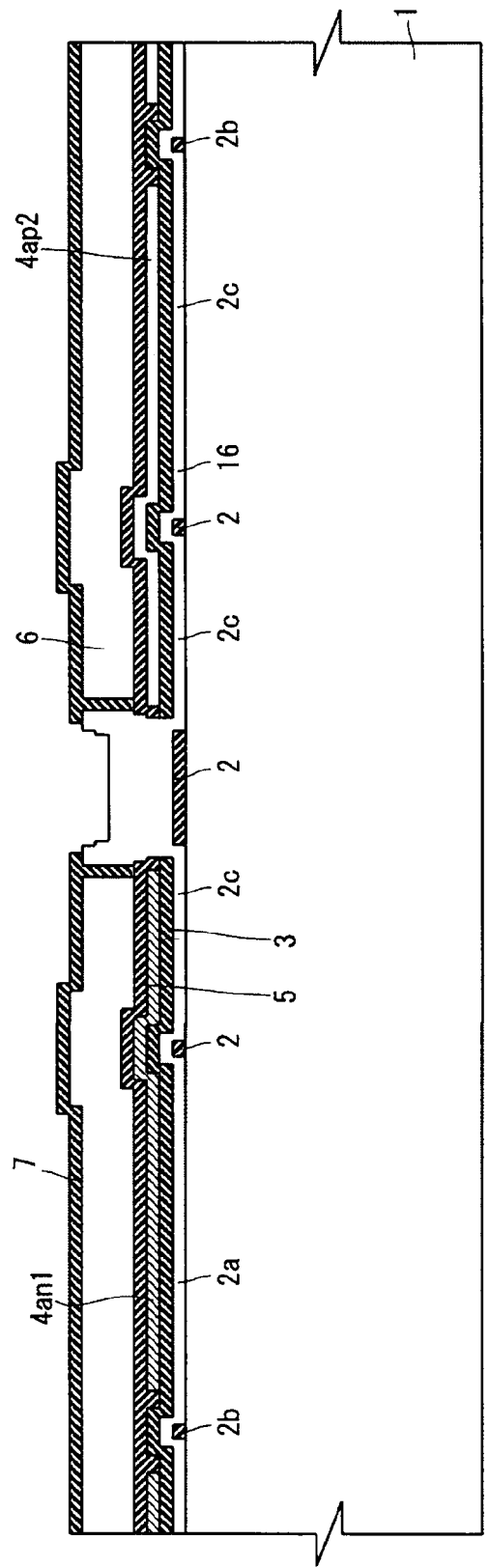
Figure 34:
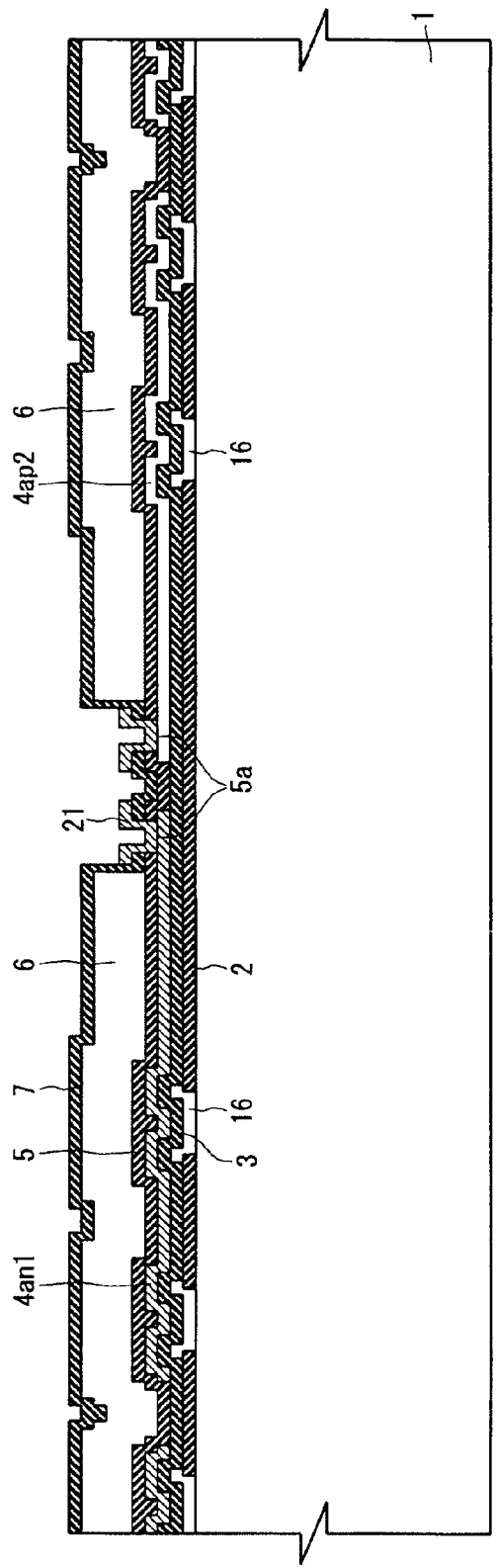

FIGS. 27 and 28 are plan views each showing a semiconductor pressure sensor in accordance with the sixth preferred embodiment of the present invention, and FIGS. 29 to 31 are cross sections taken along lines A-A to C-C of FIGS. 27 and 28, respectively. The right end of FIG. 27 and the left end of FIG. 28 are connected at a line X-X. FIGS. 32 to 34 are cross sections corresponding to FIGS. 29 to 31, respectively, showing the state before etching using an etching solution in a process of manufacturing the semiconductor pressure sensor in accordance with the sixth preferred embodiment. Hereinafter, discussion will be made on the semiconductor pressure sensor of the sixth preferred embodiment of the present invention, centering on a difference from the semiconductor pressure sensor of the second preferred embodiment, where the constituent elements identical to those of the semiconductor pressure sensor of the second preferred embodiment will be represented by the same reference signs.

As shown in FIGS. 27 and 28, the semiconductor pressure sensor of the sixth preferred embodiment comprises the semiconductor pressure sensors of the second preferred embodiment as first and second partial pressure sensors 41 and 42. Each of the first and second partial pressure sensors 41 and 42 has almost the same structure as that of one of the semiconductor pressure sensors discussed in the first to fifth preferred embodiments, and has one polysilicon diaphragm 6.

In the sixth preferred embodiment, the first partial pressure sensor 41 has two laterally adjacent p-type polysilicon wires 4ap1 and two laterally adjacent n-type polysilicon wires 4an1, instead of the above-described four p-type polysilicon wires 4a. The first partial pressure sensor 41 further has two polysilicon gauge resistors 4bp1 and 4bn1 having different conductivity types (p and n), instead of the above-described four p-type polysilicon gauge resistors 4b. These two polysilicon gauge resistors 4bp1 and 4bn1 are arranged symmetrically near the center of the polysilicon diaphragm 6 of the first partial pressure sensor 41 so that the respective longitudinal directions thereof (the direction of current flow) may be in parallel with each other. Then, the p-type polysilicon gauge resistor 4*bp*1 connects the two p-type polysilicon wires 4*ap*1 and the n-type polysilicon gauge resistor 4*bn*1 connects the two n-type polysilicon wires 4*an*1.

Similarly, the second partial pressure sensor 42 has two laterally adjacent p-type polysilicon wires 4*ap*2 and two laterally adjacent n-type polysilicon wires 4*an*2, instead of the above-described four p-type polysilicon wires 4*a*. The second partial pressure sensor 42 further has two polysilicon gauge resistors 4*bp*2 and 4*bn*2 having different conductivity types (p and n), instead of the above-described four p-type polysilicon gauge resistors 4*b*. These two polysilicon gauge resistors 4*bp*2 and 4*bn*2 are arranged symmetrically near the center of the polysilicon diaphragm 6 of the second partial pressure sensor 42 so that the respective longitudinal directions thereof (the direction of current flow) may be in parallel with each other. Then, the p-type polysilicon gauge resistor 4*bp*2 connects the two p-type polysilicon wires 4*ap*2 and the n-type polysilicon gauge resistor 4*bn*2 connects the two n-type polysilicon wires 4*an*2.

Further, the polysilicon gauge resistors 4*bp*1 and 4*bn*1 of the first partial pressure sensor 41 and the polysilicon gauge resistors 4*bp*2 and 4*bn*2 of the second partial pressure sensor 42 form a Wheatstone bridge circuit shown in FIG. 3. In the Wheatstone bridge circuit, both ends of the p-type polysilicon gauge resistor 4*bp*1 of the first partial pressure sensor 41 are connected to respective one ends of the n-type polysilicon gauge resistors 4*bn*1 and 4*bn*2 and both ends of the p-type polysilicon gauge resistor 4*bp*2 of the second partial pressure sensor 42 are connected to the respective other ends of the n-type polysilicon gauge resistors 4*bn*1 and 4*bn*2. In other words, in the Wheatstone bridge circuit, both ends of the n-type polysilicon gauge resistor 4*bn*1 of the first partial pressure sensor 41 are connected to respective one ends of the p-type polysilicon gauge resistors 4*bp*1 and 4*bp*2 and both ends of the n-type polysilicon gauge resistor 4*bn*2 of the second partial pressure sensor 42 are connected to the respective other ends of the p-type polysilicon gauge resistors 4*bp*1 and 4*bp*2.

In the sixth preferred embodiment, the partial pressure sensor 41 and the partial pressure sensor 42 are formed by using the same pattern. Therefore, it is possible to simplify pattern formation for the semiconductor pressure sensor. Further, in the sixth preferred embodiment, since the patterns for the polysilicon wires 4*ap*1, 4*an*1, 4*ap*2, and 4*an*2 are formed symmetrically, it is possible to easily increase the accuracy of the semiconductor pressure sensor.

Next, discussion will be made on a method of manufacturing the semiconductor pressure sensor having the above-discussed structure in accordance with the sixth preferred embodiment, centering on process steps different from those of the second preferred embodiment. First, like in the second preferred embodiment, the silicon substrate 1 having a main surface of which crystal orientation is (100) is prepared. Then, in the same manner as that of the second preferred embodiment, the first insulating film 2 is formed on the main surface of the silicon substrate 1 and after that, the sacrificial layer 16 is formed on the first insulating film 2.

Then, the above-discussed multilayer structure is formed. In the sixth preferred embodiment, p-type impurity such as boron (B) is selectively implanted into the polysilicon film formed between the second insulating film 3 and the third insulating film 5, to thereby form the p-type polysilicon wires 4*ap*1 and 4*ap*2 and the p-type polysilicon gauge resistors 4*bp*1 and 4*bp*2, and n-type impurity such as phosphorus (P) is selectively implanted into the same polysilicon film, to thereby form the n-type polysilicon wires 4*an*1 and 4*an*2 and the n-type polysilicon gauge resistors 4*bn*1 and 4*bn*2. The concentration of the impurity is so controlled as to achieve optimal piezoresistance effect and resistance value. After that, in the same manner as that of the second preferred embodiment, annealing is performed to thereby form the multilayer structure.

Then, in the same manner as that of the second preferred embodiment, the etching solution is supplied through the etching solution introduction hole 15 and etching of the sacrificial layer 16 and the like is performed by using the etching solution. After that, vacuum sealing is performed with the second metal layer 22 and then the glass coat 23 is formed.

Next, discussion will be made on effects of the semiconductor pressure sensor having the above structure in accordance with the sixth preferred embodiment.

Figure 35:
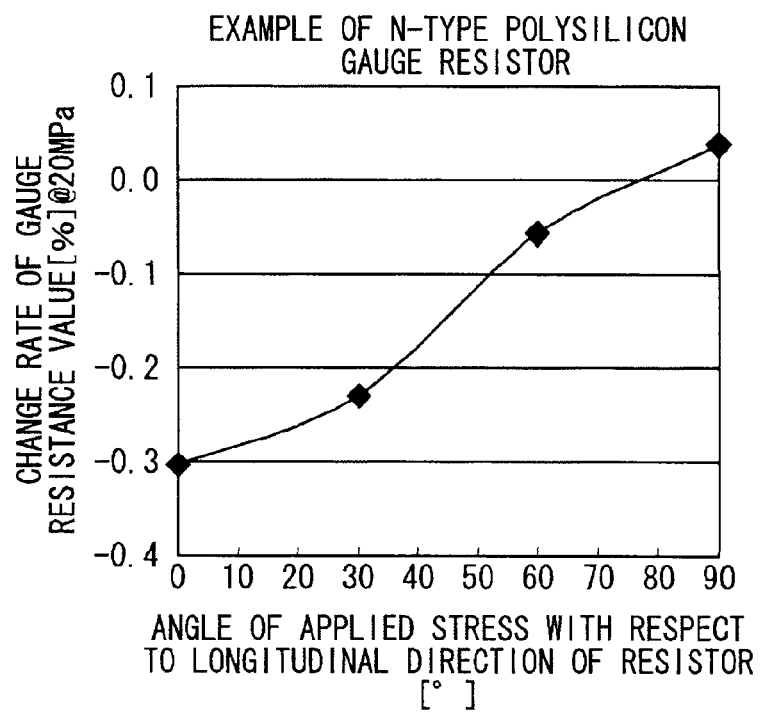
FIGS. 35 to 37 are graphs each showing an operation of the semiconductor pressure sensor in accordance with the sixth preferred embodiment.
Figure 36:
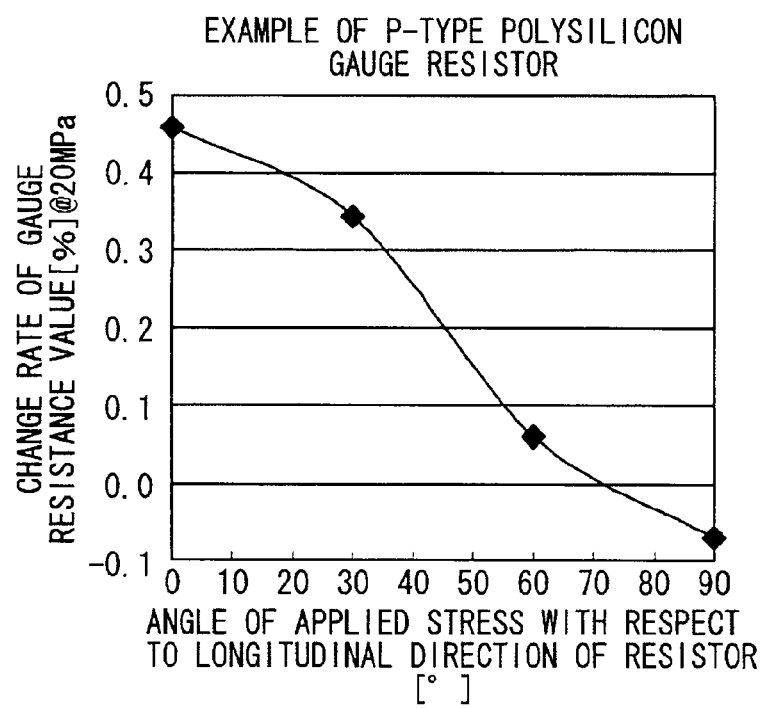

FIG. 35 is a graph showing a relation between an angle between the longitudinal direction (the direction of current flow) and the direction in which a tensile stress is applied and a change rate of the resistance value in the n-type polysilicon gauge resistors 4*bn*1 and 4*bn*2, and FIG. 36 is a graph showing the same relation in the p-type polysilicon gauge resistors 4*bp*1 and 4*bp*2. In these figures, 0° in the horizontal axis means that the tensile stress is applied in the same direction as the longitudinal direction (the direction of current flow), and 90° means that the tensile stress is applied perpendicularly with respect to the longitudinal direction (the direction of current flow).

As is clear from FIGS. 35 and 36, when the tensile stress is applied in the same direction as the longitudinal direction, the resistance value of the n-type polysilicon gauge resistors 4*bn*1 and 4*bn*2 is changed to a negative value ("−") and the resistance value of the p-type polysilicon gauge resistors 4*bp*1 and 4*bp*2 is changed to a positive value ("+"). Therefore, unlike the above-discussed semiconductor pressure sensor to which the tensile stress and the compressive stress are applied, only if only the tensile stress is applied onto the polysilicon gauge resistors 4*bp*1, 4*bp*2, 4*bn*1, and 4*bn*2, the semiconductor pressure sensor of the sixth preferred embodiment can perform the same operation as that of the above-discussed semiconductor pressure sensor. As a result, in the sixth preferred embodiment, it is possible to increase the sensitivity of the semiconductor pressure sensor as discussed below.

Figure 37:
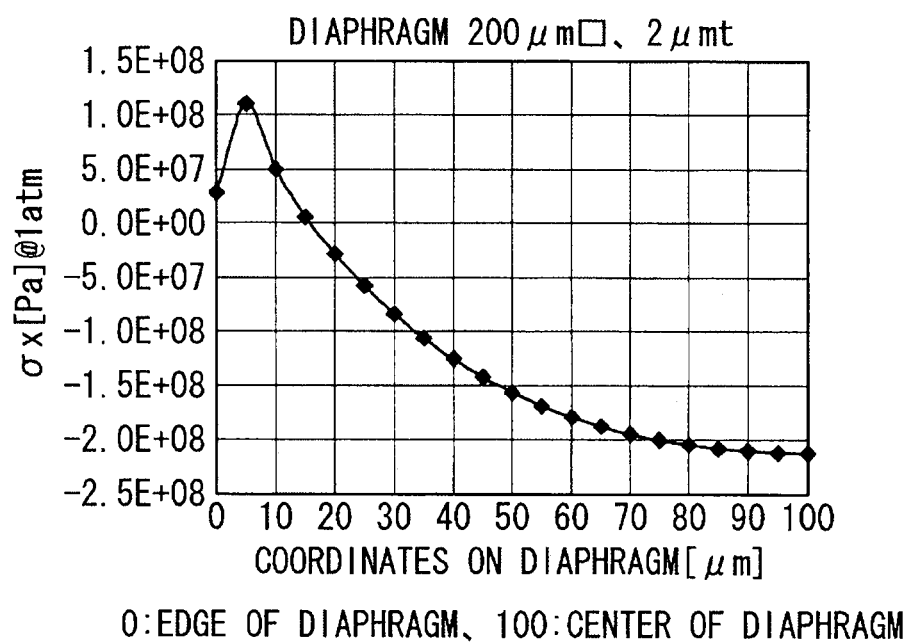

FIG. 37 is a graph showing a magnitude of the stress applied to each position of the diaphragm body 11 (the polysilicon diaphragm 6) when the pressure is applied onto the diaphragm body 11 (the polysilicon diaphragm 6). In FIG. 37, 0 μm in the horizontal axis indicates the position near the edge of the diaphragm body 11 and 100 μm indicates the position near the center of the diaphragm body 11. A positive value in the vertical axis indicates that a compressive stress is applied and a negative value indicates that a tensile stress is applied.

As shown in FIG. 37, even if the same pressure is applied onto the diaphragm body 11, the absolute value of the tensile stress applied near the center is larger than that of the compressive stress applied near the edge. Further, the change in the value of the tensile stress in a case where the position is slightly shifted near the center is smaller than the change in the value of the compressive stress in a case where the position is slightly shifted near the edge.

In the semiconductor pressure sensor and the method of manufacturing the semiconductor pressure sensor in accordance with the sixth preferred embodiment, as discussed above, the polysilicon gauge resistors 4*bp*1, 4*bp*2, 4*bn*1, and 4*bn*2 can operate only if only the tensile stress is applied thereto, and these resistors are disposed near the center.

Therefore, it is possible to increase the sensitivity of the semiconductor pressure sensor. Further, since the change of the stress is small even if the arrangement positions of the polysilicon gauge resistors $4bp1$, $4bp2$, $4bn1$, and $4bn2$ are shifted to a degree, it is possible to suppress the variation in the performance of the semiconductor pressure sensor. Further, as to other than the above, the same effects as those in the second preferred embodiment can be produced.

Though the chip size increases to a degree since the two partial pressure sensors 41 and 42 are provided in the sixth preferred embodiment, the diaphragm size is sufficiently small, specifically, is the area of a square of which one side is about 30 to 200 μm, and almost no effect is thereby produced.

As shown in FIGS. 35 and 36, though the absolute values of the resistance change rates of the n-type polysilicon gauge resistor and the p-type polysilicon gauge resistor may be different from each other when the same stress is applied thereto since the n-type polysilicon gauge resistor and the p-type polysilicon gauge resistor have different impurity concentrations, if this causes some problem, one of the absolute values may be adjusted so that one of the absolute values can be the same as the other absolute value.

While the invention has been shown and described in detail, the foregoing description is in all aspects illustrative and not restrictive. It is therefore understood that numerous modifications and variations can be devised without departing from the scope of the invention.

What is claimed is:

1. A method of manufacturing a semiconductor pressure sensor, comprising the steps of:
   (a) forming a first insulating film having a plurality of first openings on a semiconductor substrate;
   (b) forming a sacrificial layer on said first insulating film, being in contact with said semiconductor substrate in said plurality of first openings of said first insulating film;
   (c) forming a multilayer structure on said sacrificial layer, said multilayer structure including a polysilicon diaphragm, a polysilicon gauge resistor formed on a side of a space which is to serve as a vacuum chamber below said polysilicon diaphragm, and a group of insulating films containing said polysilicon diaphragm and said polysilicon gauge resistor and having an etching solution introduction hole in contact with said sacrificial layer; and
   (d) etching said sacrificial layer with an etching solution supplied through said etching solution introduction hole to thereby obtain a diaphragm body formed of said multilayer structure, which functions on the vacuum chamber, and etching a surface of said semiconductor substrate below said plurality of first openings of said first insulating film to thereby form said space which is to serve as said vacuum chamber and a diaphragm stopper disposed in said space, protruding toward near the center of the diaphragm body.

2. The method of manufacturing a semiconductor pressure sensor according to claim 1, wherein,
   said multilayer structure formed in said step (c) includes
   a second insulating film included in said group of insulating films, being formed on said sacrificial layer;
   a polysilicon wire formed on said second insulating film; and
   a third insulating film included in said group of insulating films, being formed on said polysilicon wire and having an opening from which said polysilicon wire is exposed, said method further comprising the steps of:
   (e) forming a first metal layer on said polysilicon wire in said opening of said third insulating film; and
   (f) forming a second metal layer being in contact with said first metal layer, filling said etching solution introduction hole to vacuum seal said space, and serving as an electrode pad.

3. The method of manufacturing a semiconductor pressure sensor according to claim 1, wherein,
   a tip portion of said diaphragm stopper formed in said step (d) has a cross shape in a plan view.

4. The method of manufacturing a semiconductor pressure sensor according to claim 3, wherein,
   the width of said tip portion of said diaphragm stopper is 5 μm or less.

5. The method of manufacturing a semiconductor pressure sensor according to claim 1, wherein,
   said first insulating film formed in said step (a) further has a plurality of second openings formed outside said plurality of first openings in a plan view,
   said sacrificial layer formed in said step (b) is in contact with said semiconductor substrate in said plurality of first openings and said plurality of second openings of said first insulating film,
   said etching solution introduction hole formed in said step (c) communicates with said plurality of second openings, and
   a first channel adjacent to said plurality of second openings is formed on said semiconductor substrate as part of said space in said step (d).

6. The method of manufacturing a semiconductor pressure sensor according to claim 1, wherein,
   each of said plurality of first openings of said first insulating film formed in said step (a) has a protruding portion protruding outside in a plan view,
   said etching solution introduction hole formed in said step (c) communicates with said protruding portion of each of said plurality of first openings, and
   a second channel adjacent to said protruding portion is formed on said semiconductor substrate as part of said space in said step (d).

7. The method of manufacturing a semiconductor pressure sensor according to claim 1, wherein,
   said first insulating film has one third opening formed partially combining said plurality of first openings, instead of said plurality of first openings.

8. The method of manufacturing a semiconductor pressure sensor according to claim 6, wherein,
   a side etching preventing compensation pattern for preventing said semiconductor substrate from being side-etched in etching of said step (d) is provided in said plurality of first openings of said first insulating film.

9. The method of manufacturing a semiconductor pressure sensor according to claim 5, wherein,
   an end portion of a crystal orientation (111) surface adjacent to said space, which appears on said semiconductor substrate due to etching in said step (d), overlaps said etching solution introduction hole in a plan view.

10. A semiconductor pressure sensor, comprising:
    a semiconductor substrate on which a plurality of recesses are formed in a surface thereof;
    a first insulating film formed on said semiconductor substrate, having a plurality of first openings corresponding to said plurality of recesses, respectively; and
    a diaphragm body including a polysilicon diaphragm, a polysilicon gauge resistor formed on a side of a vacuum chamber below said polysilicon diaphragm, and a group of insulating films containing said polysilicon diaphragm and said polysilicon gauge resistor, wherein said plurality of recesses on said semiconductor substrate, said plurality of first openings of said first insulating film, and a surface of said diaphragm body on a side of said recesses form said vacuum chamber, an etching solution introduction hole communicating with said vacuum chamber is provided in said group of insulating films, and a diaphragm stopper protruding toward near the center of said diaphragm body is disposed on said semiconductor substrate at said vacuum chamber.

11. The semiconductor pressure sensor according to claim 10, wherein said diaphragm body includes a second insulating film included in said group of insulating films, being supported by said first insulating film at a peripheral portion of said diaphragm body;

a polysilicon wire formed on said second insulating film;

a third insulating film included in said group of insulating films, being formed on said polysilicon wire and having an opening from which said polysilicon wire is exposed, said semiconductor pressure sensor further comprising:

a first metal layer formed on said polysilicon wire in said opening of said third insulating film; and a second metal layer being in contact with said first metal layer, filling said etching solution introduction hole to vacuum seal said vacuum chamber, and serving as an electrode pad.

12. The semiconductor pressure sensor according to claim 10, wherein a tip portion of said diaphragm stopper has a cross shape in a plan view.

13. The semiconductor pressure sensor according to claim 12, wherein the width of said tip portion of said diaphragm stopper is 5 μm or less.

14. The semiconductor pressure sensor according to claim 10, wherein said first insulating film further has a plurality of second openings formed outside said plurality of first openings in a plan view, communicating with said etching solution introduction hole, and a first channel adjacent to said plurality of second openings is formed on said semiconductor substrate as part of said vacuum chamber.

15. The semiconductor pressure sensor according to claim 10, wherein each of said plurality of first openings of said first insulating film has a protruding portion protruding outside in a plan view and communicating with said etching solution introduction hole, and a second channel adjacent to said protruding portion is formed on said semiconductor substrate as part of said vacuum chamber.

16. The semiconductor pressure sensor according to claim 10, wherein one recess partially combining said plurality of recesses is formed in said surface of said semiconductor substrate, instead of said plurality of recesses, and said first insulating film has one third opening formed partially combining said plurality of first openings, instead of said plurality of first openings.

17. The semiconductor pressure sensor according to claim 14, wherein said semiconductor substrate has a crystal orientation (111) surface in a surface thereof adjacent to said vacuum chamber, and an end portion of said surface overlaps said etching solution introduction hole in a plan view.

18. The semiconductor pressure sensor according to claim 10, wherein the thickness of a polysilicon film of said polysilicon gauge resistor ranges from 0.1 to 0.3 μm.

19. The semiconductor pressure sensor according to claim 11, wherein said diaphragm body further includes an outer frame portion contained in said group of insulating films, being formed away from and outside said polysilicon diaphragm in a plan view, and said etching solution introduction hole and said second metal layer are formed outside said outer frame portion in a plan view, said semiconductor pressure sensor further comprising a glass coat formed on said second metal layer outside said outer frame portion in a plan view.

20. A semiconductor pressure sensor comprising said semiconductor pressure sensors as defined in claim 10 as first and second partial pressure sensors, wherein each of said first and second partial pressure sensors has two said polysilicon gauge resistors which have different conductivity types and are disposed in parallel with each other near the center of said corresponding polysilicon diaphragm, and in a Wheatstone bridge circuit consisting of said polysilicon gauge resistors of said first and second partial pressure sensors, both ends of one of said polysilicon gauge resistors in one of said partial pressure sensors, having one of the conductivity types, are connected to respective one ends of said two polysilicon gauge resistors each having the other conductivity type and both ends of one of said polysilicon gauge resistors in the other one of said partial pressure sensors, having said one of the conductivity types, are connected to the respective other ends of said two polysilicon gauge resistors each having the other conductivity type.

\* \* \* \* \*